(12) United States Patent
Watanabe et al.

(10) Patent No.: US 10,126,185 B2
(45) Date of Patent: Nov. 13, 2018

(54) INPUT DEVICE AND METHOD FOR PRODUCING INPUT DEVICE

(71) Applicant: FUJIKURA LTD., Tokyo (JP)

(72) Inventors: Toshiaki Watanabe, Sakura (JP); Makoto Takamatsu, Sakura (JP); Osamu Aoki, Sakura (JP); Yasuyuki Tachikawa, Sakura (JP)

(73) Assignee: FUJIKURA LTD., Kohtoh-ku, Tokyo (JP)

( * ) Notice: Subject to any disclaimer, the term of this patent is extended or adjusted under 35 U.S.C. 154(b) by 127 days.

(21) Appl. No.: 15/108,189

(22) PCT Filed: Oct. 17, 2014

(86) PCT No.: PCT/JP2014/077721
§ 371 (c)(1),
(2) Date: Jun. 24, 2016

(87) PCT Pub. No.: WO2015/098254
PCT Pub. Date: Jul. 2, 2015

(65) Prior Publication Data
US 2016/0327440 A1 Nov. 10, 2016

(30) Foreign Application Priority Data
Dec. 27, 2013 (JP) ................. 2013-272973

(51) Int. Cl.
G01L 27/00 (2006.01)
G01L 1/20 (2006.01)
(Continued)

(52) U.S. Cl.
CPC ............... G01L 1/20 (2013.01); G01L 1/205 (2013.01); G01L 27/005 (2013.01); G06F 3/045 (2013.01);
(Continued)

(58) Field of Classification Search
CPC ..... G01L 1/16; G01L 1/18; G01L 1/20; G01L 1/22; G01L 1/225; G01L 1/2268;
(Continued)

(56) References Cited

U.S. PATENT DOCUMENTS 3,500,674 A * 3/1970 Shmuel ................ G01L 1/2268
73/1.15
4,419,620 A * 12/1983 Kurtz .................... G01D 3/021
323/280

(Continued)

FOREIGN PATENT DOCUMENTS

CN  100507809 C  7/2009
CN  202281672 U  6/2012

(Continued)

OTHER PUBLICATIONS

Japanese Office Action of JP Application No. 2013-272973 dated Feb. 25, 2014.

(Continued)

Primary Examiner — John Fitzgerald
Assistant Examiner — Alexander Mercado
(74) Attorney, Agent, or Firm — Sughrue Mion, PLLC

(57) ABSTRACT

An input device 1 comprises a sensor circuit 91 which includes a pressure-sensitive sensor 50 and a first fixed resistor 914 which is electrically connected in series to the pressure-sensitive sensor 50. A resistance value $R_f$ of the first fixed resistor 914 satisfies the following expression (1). In the expression (1), $R_{sHL}$ is a resistance value of the pressure-sensitive sensor 50 when ½ of the maximum working load of the pressure-sensitive sensor 50 is applied, and Co is a resistance correction coefficient within the range of 1/16 to 1/1.

$$R_f = R_{sHL} \times Co \qquad (1)$$

7 Claims, 18 Drawing Sheets

(51) Int. Cl.
*G06F 3/041* (2006.01)
*G06F 3/045* (2006.01)

(52) U.S. Cl.
CPC .......... *G06F 3/0414* (2013.01); *G06F 3/0418* (2013.01); *G06F 2203/04103* (2013.01); *G06F 2203/04105* (2013.01); *G06F 2203/04106* (2013.01)

(58) Field of Classification Search
CPC ....... G01L 25/00; G06F 3/0414; G06F 3/045; G06F 3/04103
See application file for complete search history.

(56) References Cited

U.S. PATENT DOCUMENTS

| | | | |
|---|---|---|---|
| 6,522,322 B1 | 2/2003 | Maeda et al. | |
| 9,772,735 B2 * | 9/2017 | Watazu | G06F 3/045 |
| 9,841,331 B2 * | 12/2017 | Wood | G01L 1/22 |
| 2006/0272383 A1 * | 12/2006 | Huang | G01L 25/00 73/1.15 |
| 2007/0024595 A1 * | 2/2007 | Baker | G06F 3/03547 345/173 |
| 2011/0157087 A1 | 6/2011 | Kanehira et al. | |
| 2015/0301660 A1 * | 10/2015 | Watazu | G06F 3/045 345/173 |
| 2015/0309651 A1 * | 10/2015 | Papakostas | G06F 3/0414 345/174 |
| 2016/0328067 A1 * | 11/2016 | Aoki | G06F 3/0416 |

FOREIGN PATENT DOCUMENTS

| | | |
|---|---|---|
| CN | 102801835 A | 11/2012 |
| JP | 62-187203 A | 8/1987 |
| JP | 2005-106513 A | 4/2005 |
| JP | 2008-256399 A | 10/2008 |
| JP | 2010-244514 A | 10/2010 |
| JP | 2011-133421 A | 7/2011 |
| JP | 2012-159362 A | 8/2012 |
| TW | 442747 B | 6/2001 |
| WO | 2011/078164 A1 | 6/2011 |

OTHER PUBLICATIONS

Japanese Decision of Refusal of JP Application No. 2013-272973 dated Jun. 24, 2014.
Taiwanese Office Action of Taiwanese Application No. 103136247 dated Sep. 23, 2015.
International Search Report of PCT/JP2014/077721 dated Nov. 18, 2014 [PCT/ISA/210].
Communication dated May 15, 2018, from the State Intellectual Property Office of People's Republic of China in counterpart Application No. 201480065336.4.

* cited by examiner

INPUT DEVICE AND METHOD FOR PRODUCING INPUT DEVICE

CROSS REFERENCE TO RELATED APPLICATIONS

This application is a National Stage of International Application No. PCT/JP2014/077721, filed Oct. 17, 2014, claiming priority based on Japanese Patent Application No. 2013-272973, filed Dec. 27, 2013, the contents of all of which are incorporated herein by reference in their entirety.

TECHNICAL FIELD

The present invention relates to an input device including a pressure-sensitive sensor and a method for producing the input device.

BACKGROUND ART

For improvement of detection accuracy of a pressure-sensitive sensor, the following is known as a technique for reducing variation in pressure-sensitive sensor characteristics between individuals.

Namely, there are known a technique to determine an approximation expression representing a relationship between output and pressure for each pressure-sensitive sensor on the basis of an actual measured data (for example, refer to Patent Document 1) and a technique to determine standardized information of external force-resistance characteristics in which a resistance value of a pressure-sensitive sensor is considered to be 0 when an external force is 0 and the resistance value of the pressure-sensitive sensor to be 1 when an external force is at its maximum (for example, refer to Patent Document 2).

PRIOR ART DOCUMENT

Patent Document

Patent Document 1: JP2005-106513 A
Patent Document 2: JP2011-133421 A

SUMMARY OF INVENTION

Problems to be Solved by Invention

However, in the first place, a pressure-sensitive sensor has characteristics in a form of a curve where a rate of decrease in resistance values is duller as an applied load is larger. Accordingly, even when load variation amounts are the same, a phenomenon that resistance variation amounts are different from each other depending on an initial load occurs. For this reason, unless characteristics of the sensitive sensor are linearized, there is a problem that detection accuracy of the pressure-sensitive sensor cannot be sufficiently improved.

An object of the present invention is to provide an input device and a method for producing the input device capable of improving detection accuracy of a pressure-sensitive sensor by linearizing characteristics of the pressure-sensitive sensor.

Means for Solving Problems

[1] An input device according to the present invention is an input device comprising at least one sensor circuit including a first circuit and a second circuit. The first circuit includes a pressure-sensitive sensor whose resistance value continuously changes in accordance with the magnitude of a pressing force, and the second circuit includes a fixed resistor and electrically connected in series to the first circuit. A combined resistance value of the second circuit satisfies the following expression (1).

[Expression 1]

$$R_f = R_{sHL} \times Co \tag{1}$$

In the above expression (1), $R_f$ is the combined resistance value of the second circuit, $R_{sHL}$ is a combined resistance value of the first circuit when ½ of the maximum working load of the pressure-sensitive sensor is applied, and Co is a resistance correction coefficient within a range of 1/16 to 1/1.

[2] In the invention, the maximum working load may be 8 [N].

[3] In the invention, the maximum working load may be the load at a point when the combined resistance value of the first circuit decreases by 50 [Ω] while a load applied to the pressure-sensitive increases by 1 [N].

[4] In the invention, the resistance correction coefficient Co may be within the range of ⅛ to ½.

[5] In the invention, the input device may comprise a plurality of sensor circuits each of which is the sensor circuit, and the resistance correction coefficients Co of the sensor circuits may be the same.

[6] In the invention, the input device may further comprise a panel unit which includes at least a touch panel, and the pressure-sensitive sensor may detect a load applied through the panel unit.

[7] In the invention, the input device may comprise: a panel unit which includes at least a touch panel; and a plurality of sensor circuits each of which is the sensor circuit. Each of the pressure-sensitive sensors may detect a load applied through the panel unit, and as a distance from the center of the panel unit to the pressure-sensitive sensor is shorter in a plan view, the resistance correction coefficient Co of the sensor circuit may be smaller.

[8] In the invention, a plurality of sensor circuits each of which is the sensor circuit may include a first sensor circuit and a second sensor circuit, the first circuit may include a first pressure-sensitive sensor located a first distance away from the center of the panel unit as the pressure-sensitive sensor, and the second sensor circuit may include a second pressure-sensitive sensor located a second distance away from the center of the panel unit as the pressure-sensitive sensor. The second distance may be relatively shorter than the first distance. The resistance correction coefficient Co of the second sensor circuit may be relatively smaller than the resistance correction coefficient Co of the first sensor circuit.

[9] In the invention, the pressure-sensitive sensor may include: a spacer with an opening; first and second substrates which face each other through the spacer; a first electrode which is arranged on the first substrate at a position where the first electrode corresponds to the opening, and a second electrode which is arranged on the second substrate at a position where the second electrode corresponds to the opening and faced to the first electrode.

[10] In the invention, the first electrode and the second electrode may contact each other in a non-load state.

[11] A method for producing an input device according to the present invention is a method for producing an input device which includes at least one sensor circuit including a first circuit and a second circuit. The first circuit includes a pressure-sensitive sensor whose resistance value continuously changes in accordance with the magnitude of a pressing force, and the second circuit includes a fixed resistor and is electrically connected to the pressure-sensitive sensor. The method for producing the input device includes: a first step for preparing the pressure-sensitive sensor; a second step for measuring a combined resistance value $R_{sHL}$ of the first circuit when ½ of the maximum working load of the pressure-sensitive sensor is applied; a third step for selecting a resistance correction coefficient Co from the range of 1/16 to 1/1; and a fourth step for making the sensor circuit by preparing the second circuit which has a combined resistance value $R_f$ of the following expression (2).

[Expression 2]

$$R_f = R_{sHL} \times Co \qquad (2)$$

[12] In the invention, the maximum working load may be 8 [N].

[13] In the invention, the maximum working load may be the load at a point when the combined resistance value of the first circuit decreases by 50 [Ω] while a load applied to the pressure-sensitive sensor increases by 1 [N].

[14] In the invention, the third step may include selecting the resistance correction coefficient Co from the range of ⅛ to ½.

[15] In the invention, the input device may include a plurality of sensor circuits each of which is the sensor circuit, and the resistance correction coefficients Co of the sensor circuits selected in the third step may be the same.

[16] In the invention, the input device may include: a panel unit which includes at least a touch panel; and a plurality of sensor circuits each of which is the sensor circuit. Each of the pressure-sensitive sensors may detect a load applied through the panel unit, and as a distance from the center of the panel unit to the pressure-sensitive sensor is shorter in a plan view, the resistance correction coefficient Co of the sensor circuit selected in the third step may be smaller.

[17] In the invention, a plurality of sensor circuits each of which is the sensor circuit may include a first sensor circuit and a second sensor circuit. The first circuit may include a first pressure-sensitive sensor located a first distance away from the center of the panel unit as the pressure-sensitive sensor, and the second circuit may include a second pressure-sensitive sensor located a second distance away from the center of the panel unit as the pressure-sensitive sensor. The second distance maybe relatively shorter than the first distance. The resistance correction coefficient Co of the second sensor circuit may be relatively smaller than the resistance correction coefficient Co of the first sensor circuit.

[18] In the invention, the pressure-sensitive sensor may include: a spacer with an opening; first and second substrates which face each other through the spacer; a first electrode which is arranged on the first substrate at a position where the first electrode corresponds to the opening; and a second electrode which is arranged on the second substrate at a position where the second electrode corresponds to the opening and faced to the first electrode.

[19] In the invention, the first electrode and the second electrode may contact each other in a non-load state.

Effect of Invention

According to the invention, a combined resistance value $R_f$ of a second circuit which is connected in series to a first circuit satisfies the above expression (1) or expression (2). Particularly, in the present invention, by making the resistance correction coefficient Co in the above expression (1) or (2) 1/1 or less, linearization of the output characteristics of the pressure-sensitive sensor can be achieved, and thus detection accuracy of the pressure-sensitive sensor can be improved.

Also, in the present invention, by using a resistance correction coefficient Co of 1/16 or greater in the above expression (1) or (2), output characteristics of the pressure-sensitive sensor can be linearized while securing an excellent dynamic range of the pressure-sensitive sensor.

BRIEF DESCRIPTION OF DRAWINGS

FIG. 18(a) is a graph showing load-output voltage characteristics of a pressure-sensitive sensor, and FIG. 18(b) is a graph showing $L_{lin}$ of the output characteristics in FIG. 18(a).

MODES FOR CARRYING OUT THE INVENTION

Hereinafter, an embodiment of the present invention will be described with reference to the accompanying drawings.

Figure 1:
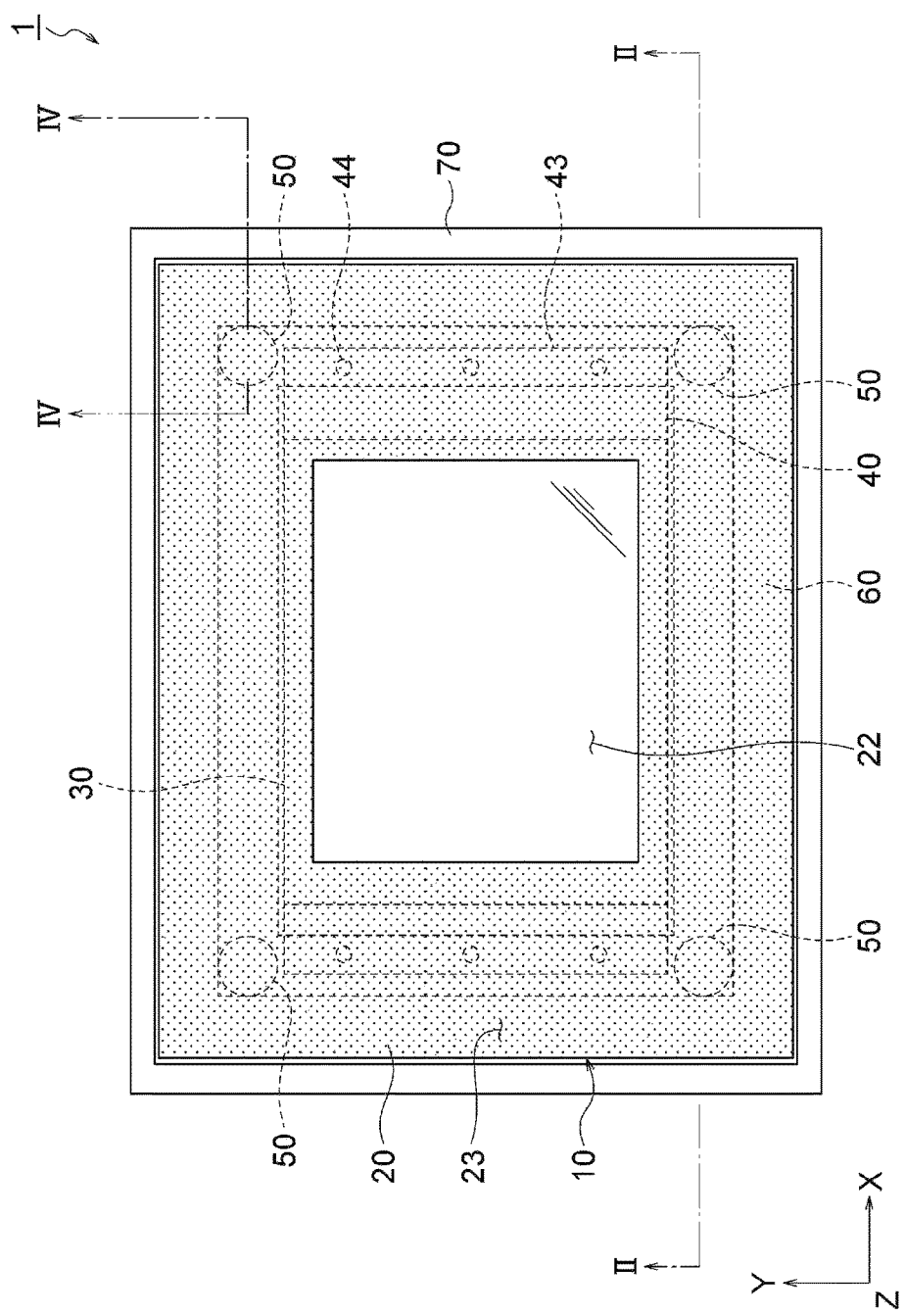
FIG. 1 is a plan view of an input device in the embodiment of the present invention.
Figure 2:
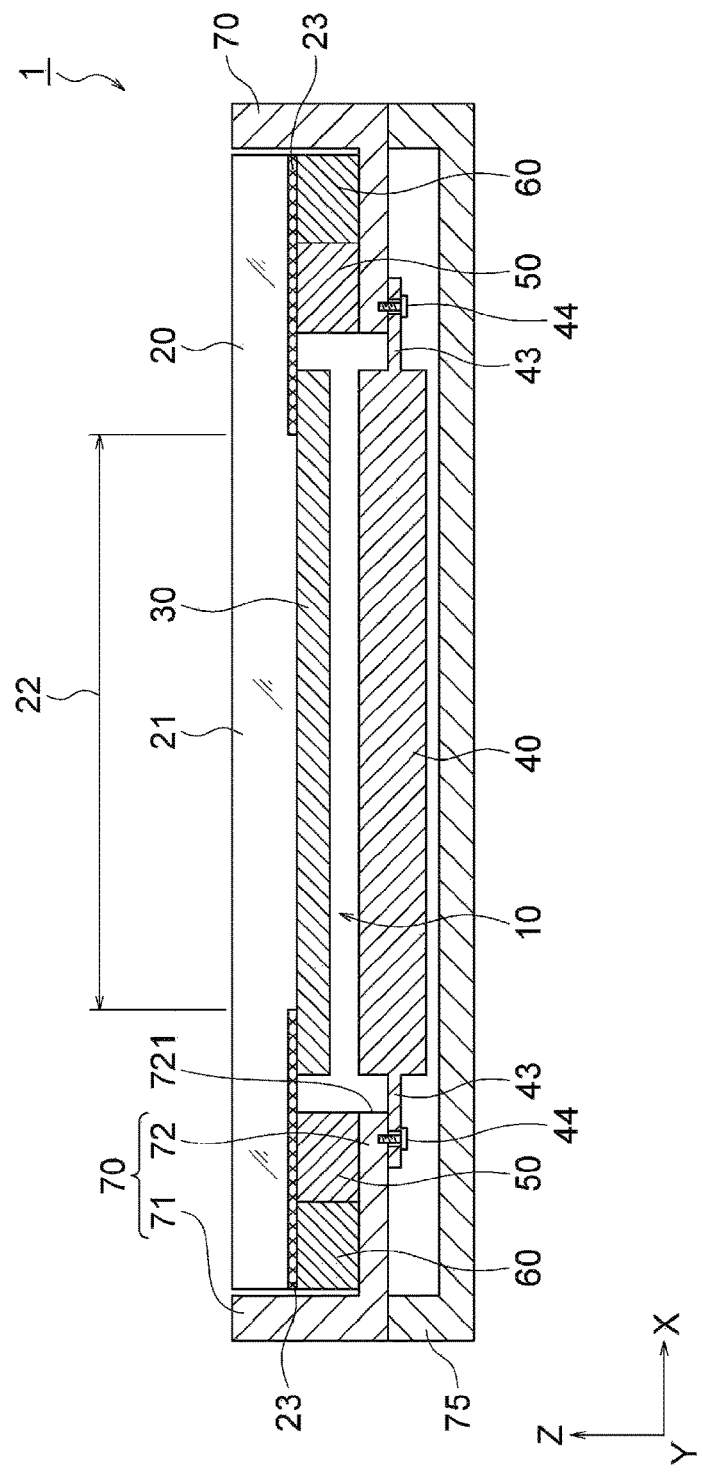
FIG. 2 is a cross-sectional view taken along line II-II in FIG. 1.

FIG. 1 is a plan view and FIG. 2 is a cross-sectional view of an input device in the embodiment of the present invention. The configuration of the input device 1 described in the following is only one example and the configuration is not particularly limited thereto.

As illustrated in FIG. 1 and FIG. 2, an input device (an electronic apparatus) in the present embodiment includes a panel unit 10, a display device 40, pressure-sensitive sensors 50, a seal member 60, a first support member 70, and a second support member 75. The panel unit 10 includes a cover member 20 and a touch panel 30. The panel unit 10 is supported by the first support member 70 through the pressure-sensitive sensors 50 and the seal member 60, and a minute vertical movement of the panel unit 10 with respect to the first support member 70 is permitted due to the elastic deformations of the pressure-sensitive sensors 50 and the seal member 60.

The input device 1 can display an image by the display device 40 (display function). In addition, in a case where an arbitrary position on the display is indicated by a finger of an operator, a touch pen, or the like, the input device 1 can detect X and Y coordinates of the position with the touch panel 30 (position input function). Further, in a case where the panel unit 10 is pressed in the Z-direction with a finger of the operator or the like, the input device 1 can detect the pressing operation with the pressure-sensitive sensors 50 (pressing detection function).

As illustrated in FIG. 1 and FIG. 2, the cover member 20 is constituted by a transparent substrate 21 through which visible light beams can be transmitted. Specific examples of such material from which the transparent substrate 21 is made include glass, polymethylmethacrylate (PMMA), polycarbonate (PC), and the like.

A shielding portion (bezel portion) 23, for example, which is formed by applying white ink, black ink, or the like, is provided on a lower surface of the transparent substrate 21. The shielding portion 23 is formed in a frame shape in a region on the lower surface of the transparent substrate 21 except for a rectangular transparent portion 22 which is located at the center of the lower surface.

The shapes of the transparent portion 22 and the shielding portion 23 are not particularly limited to the above-described shapes. A decorating member which is decorated with a white color or a black color may be laminated on a lower surface of the transparent substrate 21 so as to form the shielding portion 23. Alternatively, a transparent sheet, which has substantially the same size as the transparent substrate 21 and in which only a portion corresponding to the shielding portion 23 is colored with a white color or a black color, may be prepared, and the sheet may be laminated on the lower surface of the transparent substrate 21 so as to form the shielding portion 23.

Figure 3:
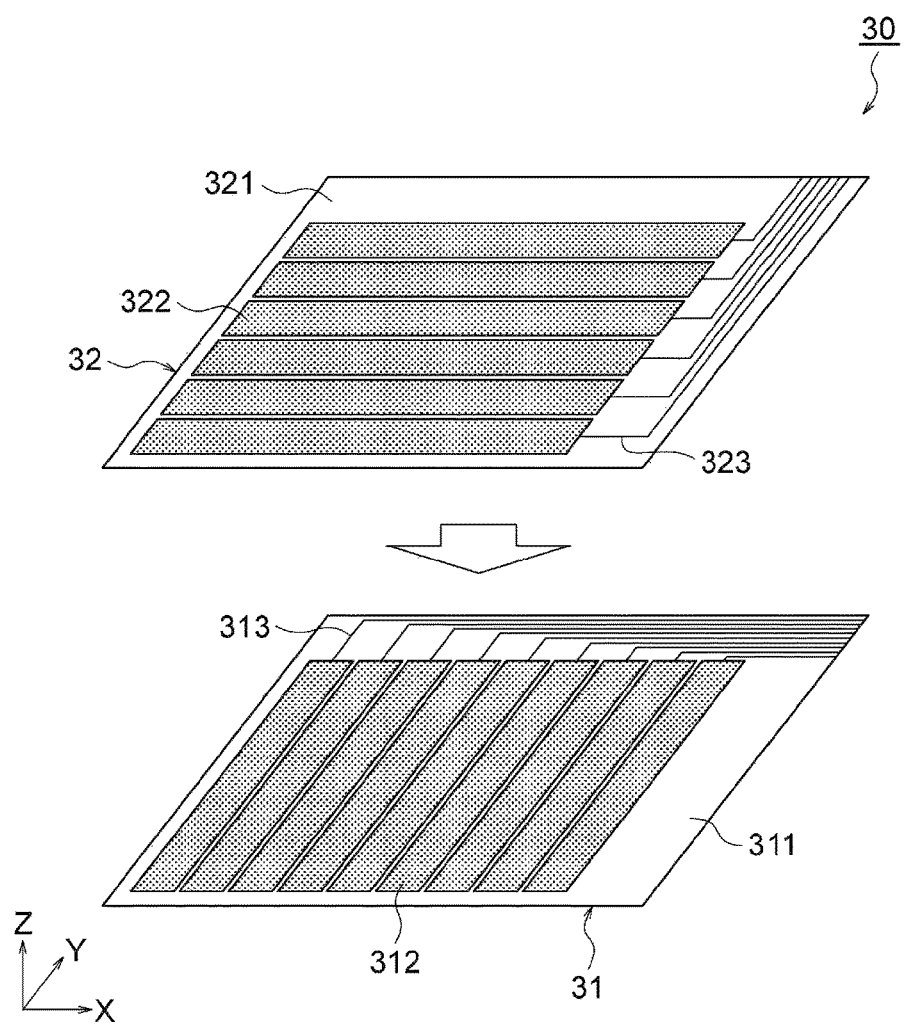
FIG. 3 is an exploded perspective view of a touch panel in the embodiment of the present invention.

FIG. 3 is an exploded perspective view of a touch panel in the present embodiment.

As illustrated in FIG. 3, the touch panel 30 is an electrostatic capacitance type touch panel including two electrode sheets 31 and 32 which overlap each other.

The structure of the touch panel is not particularly limited thereto, and for example, a resistive-film-type touch panel or an electromagnetic-induction-type touch panel may be employed. The below-described electrode patterns 312 and 322 may be formed on the lower surface of the cover member 20, and the cover member 20 may be used as a part of the touch panel. Alternatively, a touch panel prepared by forming an electrode on both surfaces of a sheet may be used instead of the two electrode sheets 31 and 32.

The first electrode sheet 31 includes a first transparent base material (substrate) 311 through which visible light beams can be transmitted, and first electrode patterns 312 which are provided on the first transparent base material 311.

Specific examples of a material from which the first transparent base material 311 is made include resin materials such as polyethylene terephthalate (PET), polyethylene naphthalate (PEN), polyethylene (PE), polypropylene (PP), polystyrene (PS), an ethylene-vinyl acetate copolymer resin (EVA), vinyl resin, polycarbonate (PC), polyamide (PA), polyimide (PI), polyvinyl alcohol (PVA), an acrylic resin, and triacetyl cellulose (TAC), and glass.

For example, the first electrode patterns 312 are transparent electrodes which are made of indium tin oxide (ITO) or a conductive polymer, and are configured as strip-like face patterns (so-called solid patterns) which extend in the Y-direction in FIG. 3. In an example illustrated in FIG. 3, nine first electrode patterns 312 are arranged in parallel on the first transparent base material 311. The shape, the number, the arrangement, and the like of the first electrode patterns 312 are not particularly limited to the above-described configurations.

In the case where the first electrode patterns 312 are made of ITO, for example, the first electrode patterns 312 are formed through sputtering, photolithography, and etching. On the other hand, in the case where the first electrode patterns 312 are made of a conductive polymer, the first electrode patterns 312 can be formed through sputtering or the like similar to the case of ITO, or can be formed through a printing method such as screen printing and gravure-offset printing, or through etching after coating.

Specific examples of the conductive polymer of which the first electrode patterns 312 are made include organic compounds such as a polythiophene-based compound, a polypyrrole-based compound, a polyaniline-based compound, a polyacetylene-based compound, and a polyphenylene-based compound. A PEDOT/PSS compound is preferably used among these compounds.

The first electrode patterns 312 may be formed by printing conductive paste on the first transparent base material 311 and by curing the conductive paste. In this case, each of the first electrode patterns 312 is formed in a mesh shape instead of the face pattern so as to secure sufficient light transmittance of the touch panel 30. As the conductive paste, for example, conductive paste obtained by mixing metal particles such as silver (Ag) and copper (Cu) with a binder such as polyester and polyphenol can be used.

The first electrode patterns 312 are connected to a touch panel controller 80 (refer to FIG. 7) through a first lead-out wiring pattern 313. The first lead-out wiring pattern 313 is provided at a position, which faces the shielding portion 23 of the cover member 20, on the first transparent base material 311, and the first lead-out wiring pattern 313 is not visually recognized by the operator. Therefore, the first lead-out wiring pattern 313 is formed by printing conductive paste on the first transparent base material 311 and by curing the conductive paste.

The second electrode sheet 32 also includes a second transparent base material (substrate) 321 through which visible light beams can be transmitted, and second electrode patterns 322 which are provided on the second transparent base material 321.

The second transparent base material 321 is made of the same material as in the above-described first transparent base material 311. Similar to the above-described first electrode patterns 312, the second electrode patterns 322 are also transparent electrodes which are made of, for example, indium tin oxide (ITO) or a conductive polymer.

The second electrode patterns 322 are configured as strip-like face patterns which extend in the X-direction in FIG. 3. In an example illustrated in FIG. 3, six second electrode patterns 322 are arranged in parallel on the second transparent base material 321. The shape, the number, the arrangement, and the like of the second electrode patterns 322 are not particularly limited to the above-described configurations.

The second electrode patterns 322 are connected to the touch panel controller 80 (refer to FIG. 7) through a second lead-out wiring pattern 323. The second lead-out wiring pattern 323 is provided at a position, which faces the shielding portion 23 of the cover member 20, on the second transparent base material 321, and the second lead-out wiring pattern 323 is not visually recognized by the operator. Therefore, similar to the above-described first lead-out wiring pattern 313, the second lead-out wiring pattern 323 is also formed by printing conductive paste on the second transparent base material 321 and by curing the conductive paste.

The first electrode sheet 31 and the second electrode sheet 32 are attached to each other through a transparent gluing agent in such a manner that the first electrode patterns 312 and the second electrode patterns 322 are substantially orthogonal to each other in a plan view. The touch panel 30 itself is attached to the lower surface of the cover member 20 through the transparent gluing agent in such a manner that the first and second electrode patterns 312 and 322 face the transparent portion 22 of the cover member 20. Specific examples of the transparent gluing agent include an acryl-based gluing agent, and the like.

The panel unit 10 including the above-described cover member 20 and touch panel 30 is supported by the first support member 70 through the pressure-sensitive sensors 50 and the seal member 60 as shown in FIG. 2. As shown in FIG. 1, four pressure-sensitive sensors 50 are arranged at the four corners of the panel unit 10 in the present embodiment. On the other hand, the seal member 60, which has a rectangular annular shape, is disposed outside the pressure-sensitive sensors 50 and arranged over the entire circumference of the panel unit 10 along the outer edge of the panel unit 10. The pressure-sensitive sensors 50 and the seal member 60 are each attached to the lower surface of the cover member 20 through a gluing agent and also to the first support member 70 through the gluing agent. The number and the arrangement of the pressure-sensitive sensors 50 are not particularly limited as long as the pressure-sensitive sensors 50 can stably hold the panel unit 10.

Figure 4:
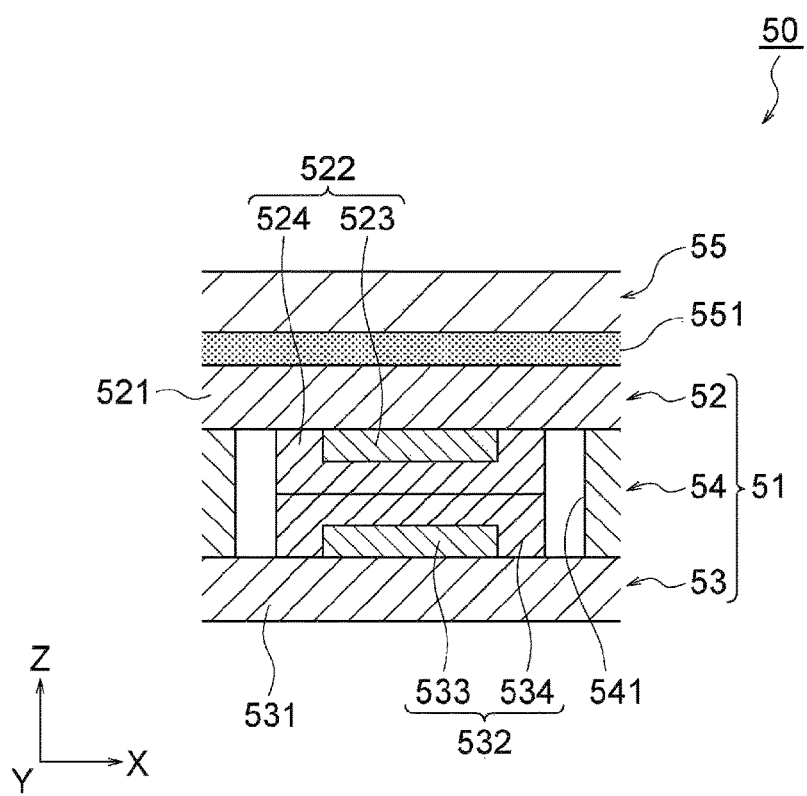
FIG. 4 is a cross-sectional view of a pressure-sensitive sensor in the embodiment of the present invention.
Figure 5:
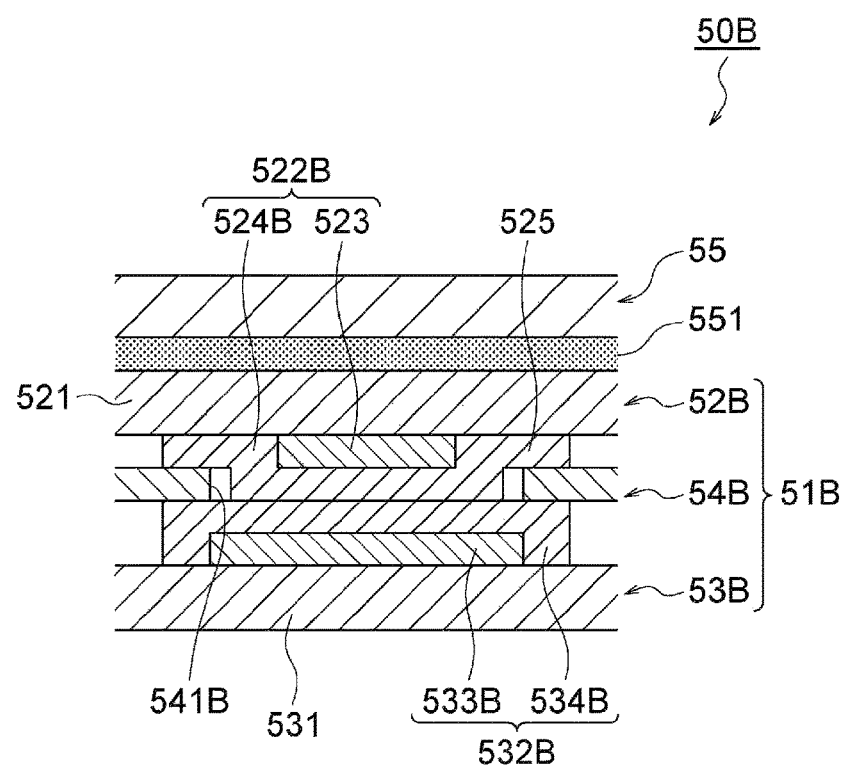
FIG. 5 is an enlarged cross-sectional view showing a modification of the pressure sensitive sensor in the embodiment of the present invention.

FIG. 4 is a cross-sectional view of a pressure-sensitive sensor in the present embodiment, and FIG. 5 is an enlarged cross-sectional view showing a modification of the pressure-sensitive sensor in the present embodiment.

As illustrated in FIG. 4, each of the pressure-sensitive sensors 50 includes a detecting part 51 and an elastic member 55. The detecting part 51 includes a first electrode sheet 52, a second electrode sheet 53, and a spacer 54 interposed therebetween. FIG. 4 is a cross-sectional view taken along line IV-IV in FIG. 1.

The first electrode sheet 52 includes a first base material (substrate) 521 and an upper electrode 522. The first base material 521 is a flexible insulating film, and is made of, for example, polyethylene terephthalate (PET), polyethylene naphthalate (PEN), polyimide (PI), polyetherimide (PEI), and the like.

The upper electrode 522 includes a first upper electrode layer 523 and a second upper electrode layer 524, and is provided on a lower surface of the first base material 521. The first upper electrode layer 523 is formed by printing conductive paste, which has a relatively low electric resistance, on the lower surface of the first base material 521, and by curing the conductive paste. On the other hand, the second upper electrode layer 524 is formed by printing conductive paste, which has a relatively high electric resistance, on the lower surface of the first base material 521 so as to cover the first upper electrode layer 523, and by curing the conductive paste.

The second electrode sheet 53 also includes a second base material (substrate) 531 and a lower electrode 532. The second base material 531 is made of the same material as in the above-described first base material 521. The lower electrode 532 includes a first lower electrode layer 533 and a second lower electrode layer 534, and is provided on an upper surface of the second base material 531.

Similar to the above-described first upper electrode layer 523, the first lower electrode layer 533 is formed by printing conductive paste, which has a relatively low electric resistance, on an upper surface of the second base material 531, and by curing the conductive paste. On the other hand, similar to the above-described second upper electrode layer 524, the second lower electrode layer 534 is formed by printing conductive paste, which has a relatively high electric resistance, on the upper surface of the second base material 531 so as to cover the first lower electrode layer 533, and by curing the conductive paste.

Examples of conductive paste, which has a relatively low electric resistance, include silver (Ag) paste, gold (Au) paste, and copper (Cu) paste. In contrast, examples of conductive paste, which has a relatively high electric resistance, include carbon (C) paste. Examples of a method for printing the conductive paste include screen printing, gravure-offset printing, an inkjet method, and the like.

The first electrode sheet 52 and the second electrode sheet 53 are laminated through a spacer 54. The spacer 54 includes a double-sided adhesive sheet and its base material is made of an insulating material such as polyethylene terephthalate (PET), polyethylene naphthalate (PEN), polyimide (PI), polyetherimide (PEI), and the like. The spacer 54 is attached to the first electrode sheet 52 and the second electrode sheet 53 through adhesive layers arranged on its both surfaces.

An opening 541 is formed in the spacer 54 at a position which corresponds to the upper electrode 522 and the lower electrode 532. The upper electrode 522 and the lower electrode 532 are located inside the through-hole 541 and are faced each other. The thickness of the spacer 54 is adjusted so that the upper electrode 522 and the lower electrode 532 come into contact with each other in a state where no pressure is applied to the pressure-sensitive sensor 50.

In a non-load state, the upper electrode 522 and the lower electrode 532 may not be in contact with each other. However, when the upper electrode 522 and the lower electrode 532 are brought into contact with each other in advance in a non-load state, a problem, in which the electrodes do not contact with each other even when a pressure is applied (that is, an output of the pressure-sensitive sensor 50 is zero (0)), does not occur, and detection accuracy of the pressure-sensitive sensor 50 can be improved.

In a state in which a predetermined voltage is applied between the upper electrode 522 and the lower electrode 532, when a load from the upper side is applied to the pressure-sensitive sensor 50, a degree of adhesion between the upper electrode 522 and the lower electrode 532 increases in accordance with the magnitude of the load, and electric resistance between the electrodes 522 and 532 decreases. On the other hand, when the load to the pressure-sensitive sensor 50 is released, a degree of adhesion between the upper electrode 522 and the lower electrode 532 decreases and electric resistance between the electrodes 522 and 532 increases.

Accordingly, the pressure-sensitive sensor 50 is capable of detecting the magnitude of the pressure applied to the pressure-sensitive sensor 50 on the basis of the resistivity change. The input device 1 in the present embodiment detects a pressing operation by an operator to the panel unit 10 by comparing an electric resistance value of the pressure-sensitive sensor 50 with a predetermined threshold value. In the present embodiment, "an increase in the degree of adhesion" means an increase in a microscopic contact area, and "a decrease in the degree of adhesion" means a decrease in the microscopic contact area.

The second upper electrode layer 524 or the second lower electrode layer 534 may be formed by printing a pressure-sensitive ink instead of the carbon paste, and by curing the pressure-sensitive ink. For example, a specific example of the pressure-sensitive ink includes a quantum tunnel composite material which utilizes the quantum tunnel effect. Another example of the pressure-sensitive ink includes, for example, a pressure-sensitive ink containing conductive particles of metal, carbon or the like, elastic particles of an organic elastic filler, inorganic oxide filler or the like, and a binder. The surface of the pressure-sensitive ink is uneven with elastic particles. The electrode layers 523, 524, 533, and 534 can be formed through a plating process or a patterning process instead of the printing method.

An elastic member 55 is laid on the first electrode sheet 52 through a gluing agent 551. The elastic member 55 is made from an elastic material such as a foaming material or rubber material. Specific examples of the foaming material forming the elastic member 55 include, for example, a urethane foam, a polyethylene foam, and a silicone foam each of which has closed cells. Further, examples of the rubber material forming the elastic member 55 include a polyurethane rubber, a polystyrene rubber, and a silicone rubber. The elastic member 55 may be laid under the second electrode sheet 53. Alternatively, the elastic members 55 may be laid on the first electrode sheet 52 and also under the second electrode sheet 53.

By providing the elastic member 55 to the pressure-sensitive sensor 50, the load applied to the pressure-sensitive sensor 50 can be dispersed evenly throughout the detecting part 51 and detection accuracy of the pressure-sensitive sensor 50 can be improved. When the support member 70, 75, or the like is distorted or when the tolerance of the support member 70, 75, or the like in the thickness direction is large, the distortion and tolerance can be absorbed by the elastic member 55. When excess pressure or shock is applied to the pressure-sensitive sensor 50, damage or destruction of the pressure-sensitive sensor 50 can also be prevented with the elastic member 55.

The structure of the pressure-sensitive sensor is not particularly limited to the above. For example, as in a pressure-sensitive sensor 50B shown in FIG. 5, an annular protruding part 525 may be formed with a second upper electrode layer 524B of an upper electrode 522B, a lower electrode 532B may be expanded so as to make its diameter the same as the protruding part 525, and a spacer 54B may be formed so as to be sandwiched between the protruding part 525 and the lower electrode 532B. The protruding part 525 in the present embodiment protrudes radially from the upper part of the upper electrode 522B. Further, the inner diameter of an opening 541B of the spacer 54B in the present embodiment is relatively smaller than the outer diameter of the protruding part 525 of the upper electrode 522B and the outer diameter of the lower electrode 532B.

The pressure-sensitive sensor is not particularly limited to the configuration shown in FIG. 4 and FIG. 5 above, as long as its resistance value continuously changes according to the magnitude of the pressing force. For example, a strain gauge may be used as the pressure-sensitive sensor. Alternatively, a Micro Electro Mechanical Systems (MEMS) element of a cantilevered shape (or a both-ends supported shape) having a piezo-resistance layer may be used as the pressure-sensitive sensor. Alternatively, the one using a conductive rubber may also be used as the pressure-sensitive sensor.

As with the above elastic member 55, a seal member 60 is also made of an elastic material such as a foaming material, rubber material or the like. Specific examples of the foaming material forming the seal member include, for example, a urethane foam, a polyethylene foam, a silicone foam, and the like each of which has closed cells. Further, examples of the rubber material forming the seal member 60 include a polyurethane rubber, a polystyrene rubber, a silicone rubber, and the like. By placing such seal member 60 between a cover member 20 and the first support member 70, inclusion of foreign substances from the outside can be prevented.

Preferably, the elasticity modulus of the elastic member 55 is respectively higher than the elasticity modulus of the seal member 60. In this way, pressing force can be accurately transmitted to the pressure-sensitive sensor 50, and detection accuracy of the pressure-sensitive sensor 50 can be improved.

As shown in FIG. 2, the pressure-sensitive sensors 50 and the seal member 60 described above are sandwiched between the cover member 20 and the first support member 70. The first support member 70 includes a frame part 71 and a holder 72. The frame part 71 has a rectangular frame shape with an opening capable of housing the cover member 20. On the other hand, the holder 72 has a rectangular annular shape and is radially protruded to the inside from the lower end of the frame part 71. The pressure sensitive sensors 50 and the seal member 60 are supported by the support member 72 so as to be interposed between the cover member 20 and the first support member 70. The first support member 70 is made of, for example, a metal material such as aluminum or the like, or a resin material such as polycarbonate (PC), ABS resin, or the like. The frame part 71 and the holder 72 are integrally formed.

Figure 6:
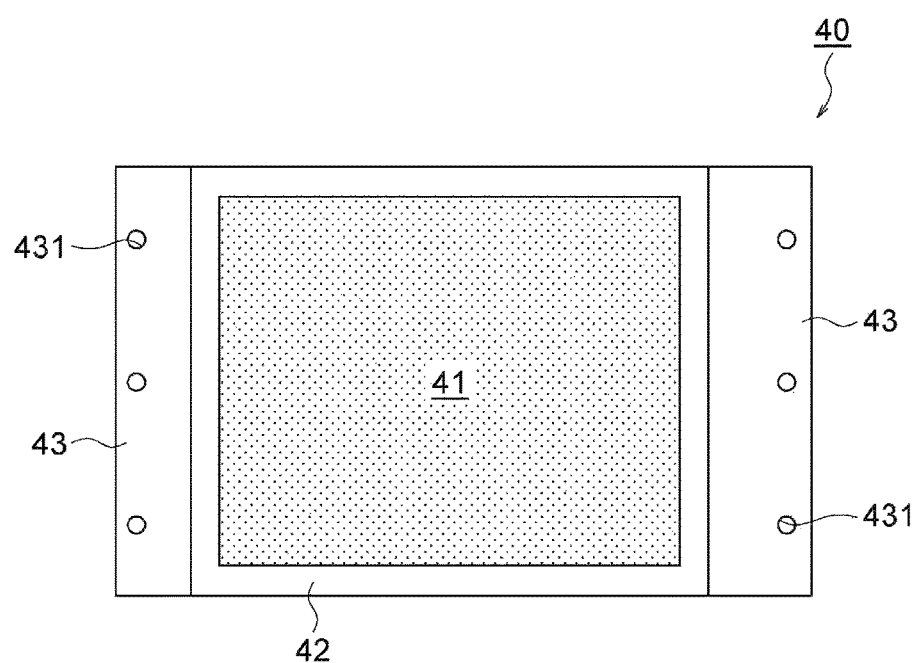
FIG. 6 is a plan view of a display device in the embodiment of the present invention.

FIG. 6 is a plan view of a display device in the present embodiment.

As illustrated in FIG. 6, the display device 40 includes a display region 41 on which an image is displayed, an outer edge region 42 which surrounds the display region 41, and a flange 43 which protrudes from both ends of the outer edge region 42. For example, the display region 41 of the display device 40 is constituted by a thin-type display device such as a liquid crystal display, an organic EL display, or an electronic paper.

A through-hole 431 is formed on the flange 43. The through-hole 431 faces a screw hole formed on the rear surface of the first support member 70. As shown in FIG. 2, when a screw 44 is screwed into the screw hole of the first support member 70 through the through-hole 431, the display device 40 is fixed to the first support member 70. Accordingly, the display region 41 faces a transparent portion 22 of the cover member 20 through a center opening 721 of the first support member 70.

Like the first support member 70 described above, the second support member 75 is made of, for example, a metal material such as aluminum or the like, or a resin material such as polycarbonate (PC), ABS resin, or the like. The second support member 75 is attached to the first support member 70 through a gluing agent so as to cover the rear surface of the display device 40. Instead of the gluing agent, the second support member 75 may be fastened with a screw to the first support member 70.

In the following, a system configuration of the input device 1 in the present embodiment is explained with reference to FIG. 7 to FIG. 10.

Figure 7:
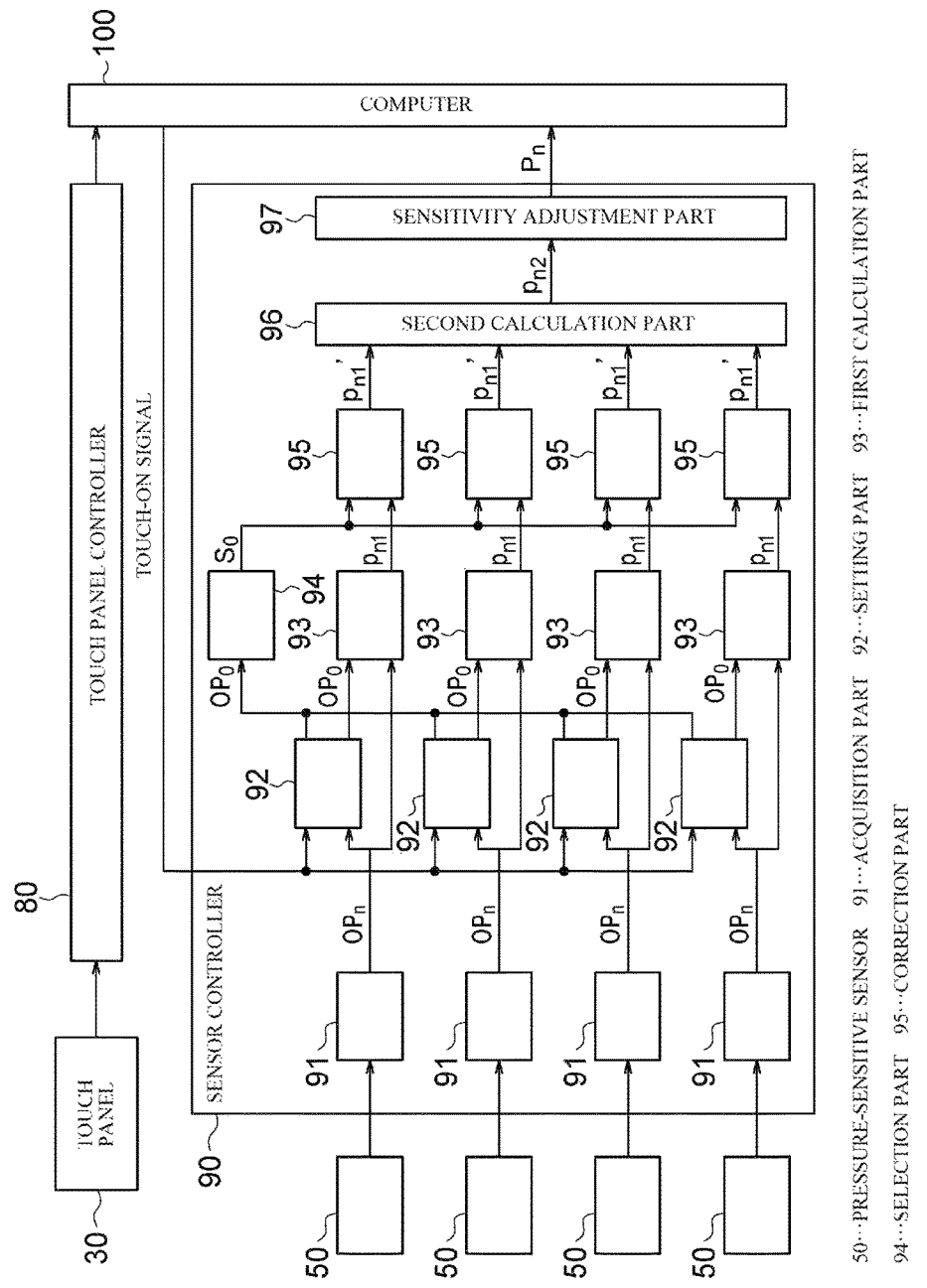
FIG. 7 is a block diagram showing a system configuration of the input device in the embodiment of the present invention.
Figure 8:
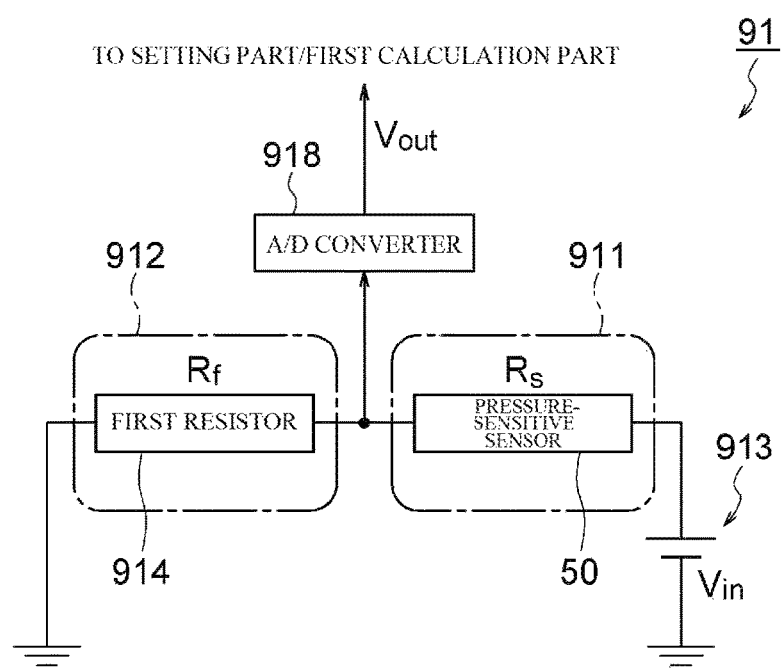
FIG. 8 is a circuit diagram showing detailed configuration of an acquisition part in FIG. 7.
Figure 9:
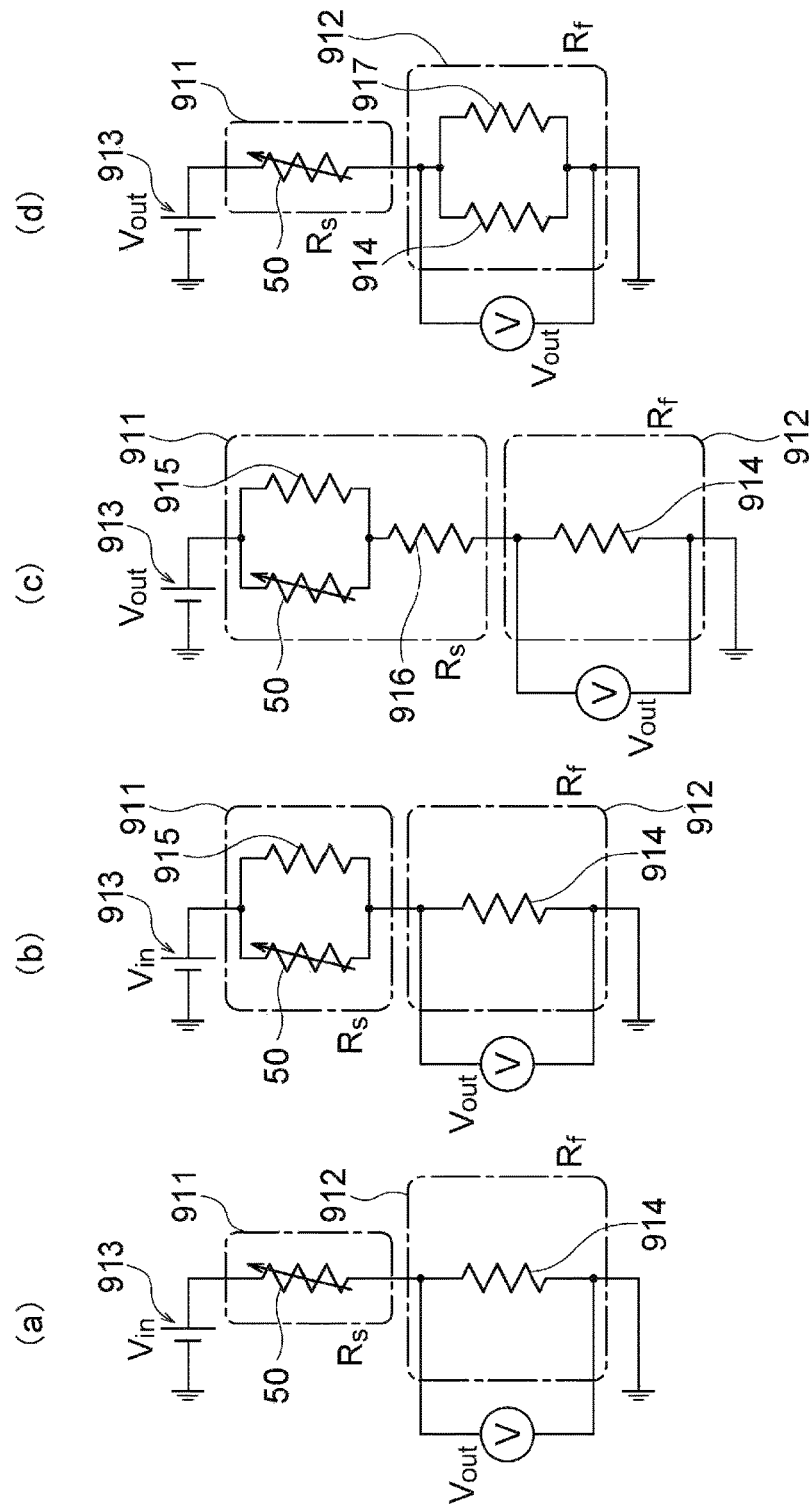
FIG. 9(a) is an equivalent circuit diagram of the acquisition part shown in FIG. 8, and FIG. 9(b) to FIG. 9(d) are the equivalent circuit diagrams showing modifications of the acquisition part.
Figure 10:
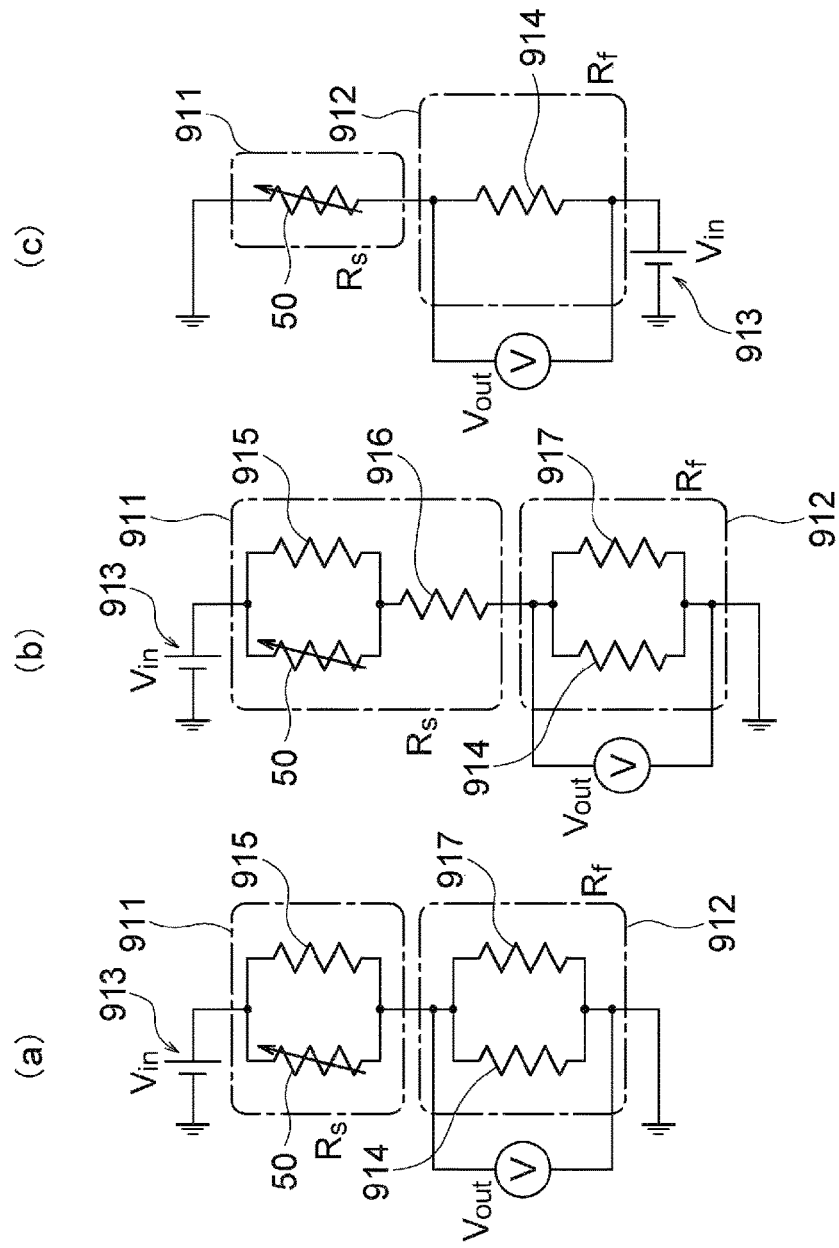
FIG. 10(a) to FIG. 10(c) are the equivalent circuit diagrams showing modifications of the acquisition part.

FIG. 7 is a block diagram showing a system configuration of the input device in the present embodiment. FIG. 8 is a circuit diagram showing details of the acquisition part in FIG. 7. FIG. 9(a) is an equivalent circuit diagram of the acquisition part shown in FIG. 8. FIG. 9(b) to FIG. 9(d) and FIG. 10(a) to FIG. 10(c) are equivalent circuit diagrams showing modifications of the acquisition part.

As shown in FIG. 7, the input device 1 in the present embodiment includes a touch panel controller 80 to which a touch panel 30 is electrically connected, a sensor controller 90 to which pressure-sensitive sensors 50 are electrically connected, and a computer 100 to which the controller 80 and controller 90 are electrically connected.

The touch panel controller 80 includes, for example, an electrical circuit or the like including such as a CPU. The touch panel controller 80 periodically applies a predetermined voltage between the first electrode patterns 312 and second electrode patterns 322 of the touch panel 30, detects a position (an X-coordinate value and a Y-coordinate value) of a finger on the touch panel 30 on the basis of a variation in electrostatic capacitance at each intersection between the first electrode patterns 312 and the second electrode patterns 322, and outputs the X and Y coordinate values to the computer 100.

When a value of the electrostatic capacitance becomes a predetermined threshold value or more, the touch panel controller 80 detects that a finger of the operator came into contact with the cover member 20 and sends a touch-on signal to the sensor controller 90 through the computer 100.

In contrast, when a value of the electrostatic capacitance becomes less than the predetermined threshold value, the touch panel controller 80 detects that a finger of the operator became untouched from the cover member 20 and sends a touch-off signal to the sensor controller 90 through the computer 100.

When the touch panel controller 80 detects that a finger of the operator approaches the cover member 20 within a predetermined distance (a so-called hover state), the touch panel controller 80 may send a touch-on signal.

Like the touch panel controller 80, the sensor controller 90 includes, for example, an electrical circuit with a CPU or the like. The sensor controller 90 functionally includes, as shown in FIG. 7, acquisition parts 91, setting parts 92, first calculation parts 93, a selection part 94, correction parts 95, a second calculation part 96, and a sensitivity adjustment part 97.

Each of the acquisition parts 91 includes a sensor circuit as shown in FIG. 8 and FIG. 9(a). Specifically, the sensor circuit 91 includes a first circuit 911, a second circuit 912 electrically connected in series to one end of the first circuit 911, a power supply 913 electrically connected to the other end of the first circuit 911, and an A/D converter 918 connected between the first circuit 911 and the second circuit 912.

In the present embodiment, the first circuit 911 only includes the pressure-sensitive sensor 50, and the second circuit 912 only includes a first fixed resistor 914. The first fixed resistor 914 is connected in series to the upper electrode 522 (or the lower electrode 532) of the pressure-sensitive sensor 50, whereas the power supply 913 is connected in series to the lower electrode 532 (or the upper electrode 522) of the pressure-sensitive sensor 50.

In a state in which a predetermined voltage is applied between the electrode 522 and electrode 532 by the power supply 913, when a load from the upper side is applied to the pressure-sensitive sensor 50, an electrical resistance value between the electrode 522 and electrode 532 varies in accordance with the magnitude of the load. The acquisition part 91 periodically samples an analog signal of a voltage value, which corresponds to the resistance variation, from the pressure-sensitive sensor 50 at a constant interval, converts the analog signal into a digital signal with an A/D converter 918, and outputs the digital signal (an output value $OP_n$) to the setting part 92 and the first calculation part 93. The output value $OP_n$ ($=V_{out}$) which is output from the acquisition part 91 can be represented by the following expression (3).

[Expression 3]

$$V_{out} = V_{in} \frac{R_f}{R_f + R_s} \quad (3)$$

In the expression (3) above, $R_s$ is a resistance value of the pressure-sensitive sensor 50, $V_{in}$ is an input-voltage value to the pressure-sensitive sensor 50 (that is, voltage applied by the power supply 913), and $R_f$ is a resistance value of the first fixed resistor 914.

The acquisition part 91 in the present embodiment corresponds to an example of a sensor circuit in the present invention, the first circuit 911 in the present embodiment corresponds to an example of a first circuit in the present invention, and the pressure-sensitive sensor 50 in the present embodiment corresponds to an example of a pressure-sensitive sensor in the present invention. Further, the second circuit 912 in the present embodiment corresponds to an example of a second circuit in the present invention, and the first fixed resistor 914 in the present embodiment corresponds to a first fixed resistor in the present invention.

Furthermore, in the present embodiment, the first fixed resistor 914 of the acquisition part 91 has a resistance value $R_f$ which satisfies the following expression (4).

[Expression 4]

$$R_f = R_{sHL} \times Co \quad (4)$$

In the above expression (4), $R_{sHL}$ is a resistance value of the pressure-sensitive sensor 50 when ½ of the maximum working load of the pressure-sensitive sensor 50 is applied. Here, the maximum working load of the pressure-sensitive sensor 50 means a maximum value within a designed usable load range set to the pressure-sensitive sensor 50 installed in the input device 1. In the present embodiment, the maximum working load of the pressure-sensitive sensor 50 is 8 [N], accordingly, the applied load is 4 [N] for the resistance value $R_{sHL}$. Here, the applied load for the resistance value $R_{sHL}$ is set to ½ of the maximum working load of the pressure-sensitive sensor 50, in order to uniformize changes in the output value $V_{out}$ of the pressure-sensitive sensor 50 throughout the working load range of the pressure-sensitive sensor 50, and to reduce variation in the output from a plurality of the pressure-sensitive sensors 50.

The maximum working load of the pressure-sensitive sensor 50 may be set to the load at the point when a resistance value of the pressure-sensitive sensor 50 decreases by 50 [Ω] while the load applied to the pressure-sensitive sensor 50 increases by 1 [N]. In other words, the maximum working load of the pressure-sensitive sensor 50 may be set to the minimum value among the loads where a decreased resistance amount of the pressure-sensitive sensor 50 becomes 50 [Ω] or less relative to the increased amount of 1 [N] in the load applied to the pressure-sensitive sensor 50.

In contrast, Co in the above expression (4) is a resistance correction coefficient selected from a range of 1/16 to 1/1 (1/16≤Co≤1/1), preferably a resistance correction coefficient selected from a range of ⅛ to ½ (⅛≤Co≤½), and more preferably a resistance correction coefficient selected from a range of ⅛ to ⅓ (⅛≤Co≤⅓).

In the present embodiment, as the first fixed resistor 914 has a resistance value which satisfies the above expression (4), an output value $OP_n$ (=$V_{out}$) of the pressure-sensitive sensor 50 can be brought close to a straight line throughout the range of the applied working load while securing an excellent dynamic range of the pressure-sensitive sensor, and output characteristics of the pressure-sensitive sensor 50 can be linearized.

As the resistance correction coefficient Co is larger, linearity in the output characteristics of the pressure-sensitive sensor 50 is worse. On the other hand, as the resistance correction coefficient Co is smaller, a dynamic range of the pressure-sensitive sensor 50 is narrower.

Such acquisition part 91 is arranged for each pressure-sensitive sensor 50 as shown in FIG. 7. Also, a resistance value $R_f$ of each of the first fixed resistance elements 914 is set individually. Accordingly, each of the acquisition parts 91 individually obtains an output value $OP_n$ for each pressure-sensitive sensor 50.

In contrast, as for the resistance correction coefficient Co, a common value is set for all pressure-sensitive sensors 50 (four in the present embodiment), and the same resistance correction coefficient Co is set for the all pressure-sensitive sensors 50. Particularly, when a distance from the center of the panel unit 10 to each of the pressure-sensitive sensors 50 is substantially the same in a plan view, the same resistance correction coefficient Co is preferably set to all of the pressure-sensitive sensors 50. In this way, inclination of the output characteristics can be made uniform for all pressure-sensitive sensors 50, and variation in output characteristics of the pressure-sensitive sensors 50 can be suppressed.

The resistance correction coefficient Co may be individually set for each pressure-sensitive sensor 50.

Figure 11:
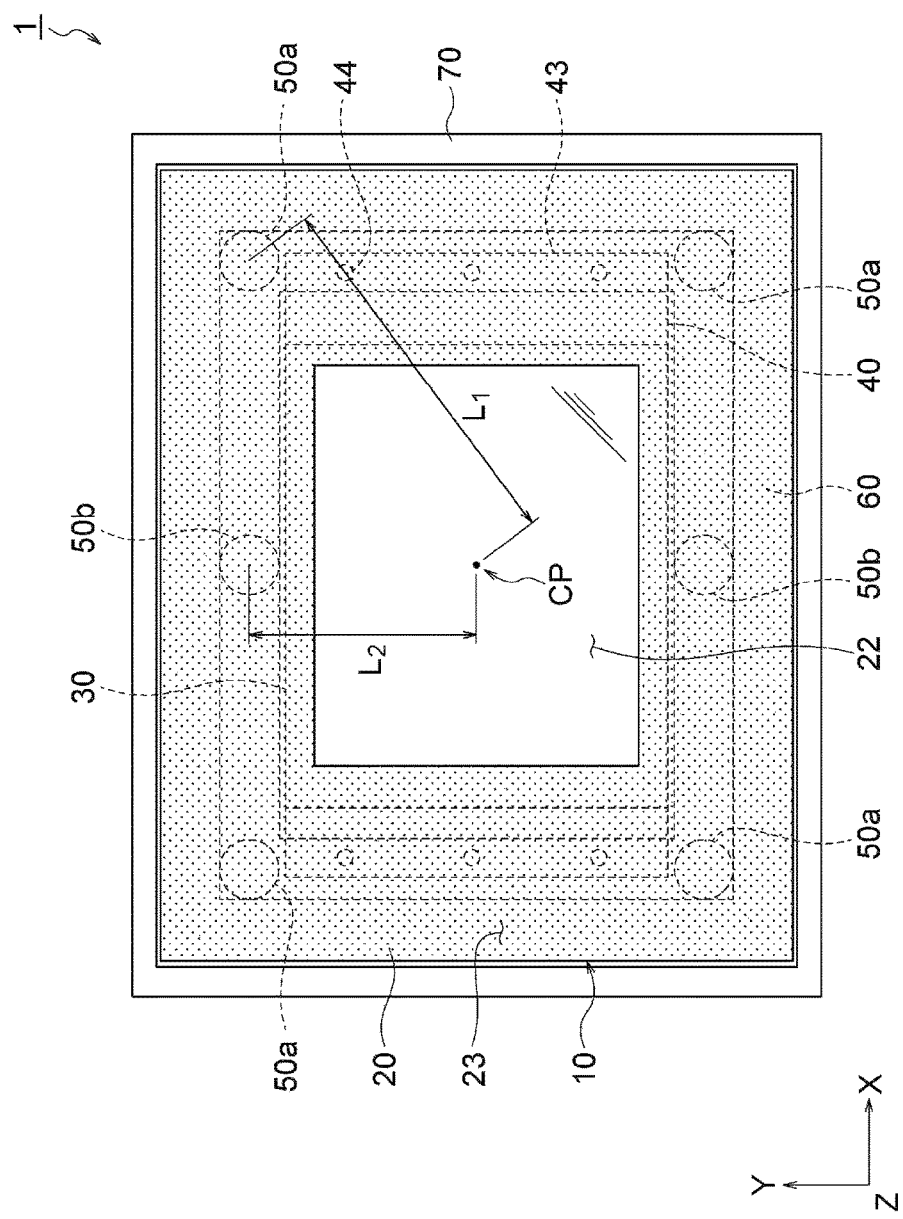
FIG. 11 is a plan view showing a modification of the input device in the embodiment of the present invention.

For example, in an example shown in FIG. 11, an input device 10 includes four first pressure-sensitive sensors 50a and two second pressure-sensitive sensors 50b. In a plan view, the second distance $L_2$ between the two second pressure-sensitive sensors 50b and the center CP of the panel unit 10 is relatively shorter than the first distance $L_1$ between the four first pressure-sensitive sensors 50a and the center CP of the panel unit 10 ($L_2 < L_1$). The first and second pressure-sensitive sensors 50a and 50b are the sensors having the same configuration as the above-described pressure-sensitive sensor 50. FIG. 11 is a plan view showing a modification of the input device in the present embodiment.

In the case above, the resistance correction coefficient Co for the second pressure-sensitive sensor 50b may be relatively set smaller than the resistance correction coefficient Co for the first pressure-sensitive sensor 50a. In other words, when a plurality of pressure-sensitive sensors include pressure-sensitive sensors 50a and 50b having different distances from the center CP of the panel unit 10, as the distance from the center CP of the panel unit 10 to the pressure-sensitive sensor 50b is shorter, the resistance correction coefficient Co for the pressure-sensitive sensor 50b may be set smaller. The positions of the pressure-sensitive sensors relative to the panel unit are not particularly limited to the example shown in FIG. 11.

In general, when a panel unit is pressed, due to bending of the panel unit, pressure applied to the pressure-sensitive sensor is smaller as a distance from the center of the panel unit is longer, and the pressure applied to the pressure-sensitive sensor is larger as the distance from the center of the panel unit is shorter. Whereas, in the present embodiment, by making the resistance correction coefficient Co for the pressure-sensitive sensor 50b closer to the center CP of the panel unit 10 relatively smaller (making the Co of the pressure-sensitive sensor 50a farther from the center CP of the panel unit 10 relatively larger) as above, the inclination of the output characteristics of the pressure-sensitive sensors 50a and 50b can be made uniform and variation in the output characteristics of the pressure-sensitive sensors 50a and 50b can be suppressed.

The circuit configuration of the acquisition part 91 is not particularly limited to the above configuration. In the following, modifications of the circuit configuration for the acquisition part 91 are described with reference to FIG. 9(b) to FIG. 10(c).

As shown in FIG. 9(b), the first circuit 911 may include a second fixed resistor 915 which is connected in parallel to the pressure-sensitive sensor 50. In this case, a resistance value $R_2$ in the above expression (3) is a combined resistance value of the pressure-sensitive sensor 50 and the second fixed resistor 915.

In the modification shown in FIG. 9(b), the first circuit 911 including the pressure-sensitive sensor 50 and a second fixed resistor 915 corresponds to an example of the first circuit in the present invention, the second circuit 912 including only the first fixed resistor 914 corresponds to an example of the second circuit in the present invention.

As shown in FIG. 9(c), the first circuit 911 may include a third resistor 916 which is connected in series to a parallel circuit including the pressure-sensitive sensor 50 and the second fixed resistor 915. In this case, the resistance value $R_s$ in the above expression (3) is a combined resistance value of the pressure-sensitive sensor 50, the second fixed resistor 915, and the third fixed resistor 916.

In the modification shown in FIG. 9(c), the first circuit 911 including the pressure-sensitive sensor 50, a second fixed resistor 915, and the third fixed resistor 916 corresponds to an example of the first circuit in the present invention, and the second circuit 912 including only the first fixed resistor 914 corresponds to an example of the second circuit in the present invention.

As shown in FIG. 9(d), the second circuit 912 may include a fourth fixed resistor 917 which is connected in parallel to the first fixed resistor 914. In this case, the resistance value $R_f$ in the above expression (3) is a combined resistance value of the first fixed resistor 914 and the fourth fixed resistor 917.

In the modification shown in FIG. 9(d), the first circuit 911 including only the pressure-sensitive sensor 50 corresponds to an example of the first circuit in the present invention, and the second circuit 912 including the first fixed resistor 914 and the fourth fixed resistor 917 corresponds to an example of the second circuit in the present invention.

As shown in FIG. 10(a), the first circuit 911 may include the second fixed resistor 915 which is connected in parallel to the pressure-sensitive sensor 50, and the second circuit 912 may include the forth fixed resistor 917 which is connected in parallel to the first fixed resistor 914. In this case, the resistance value $R_s$ in the above expression (3) is a combined resistance value of the pressure-sensitive sensor 50 and the second fixed resistor 915, and the resistance value $R_f$ in the above expression (3) is a combined resistance value of the first fixed resistor 914 and the fourth fixed resistor 917.

In the modification shown in FIG. 10(a), the first circuit 911 including the pressure-sensitive sensor 50 and the second fixed resistor 915 corresponds to an example of the first circuit in the present invention, and the second circuit 912 including the first fixed resistor 914 and the fourth fixed resistor 917 corresponds to an example of the second circuit in the present invention.

As shown in FIG. 10(b), the first circuit 911 may include the third fixed resistor 916 which is connected in series to a parallel circuit including the pressure-sensitive sensor 50 and the second fixed resistor 915, and the second circuit 912 may include the fourth fixed resistor 917 which is connected in parallel to the first fixed resistor 914. In this case, the resistance value $R_s$ in the above expression (3) is a combined resistance value of the pressure-sensitive sensor 50, the second fixed resistor 915 and the third fixed resistor 916, and the resistance value $R_f$ in the above expression (3) is a combined resistance value of the first fixed resistor 914 and the fourth fixed resistor 917.

In the modification shown in FIG. 10(b), the first circuit 911 including the pressure-sensitive sensor 50, the second fixed resistor 915, and the third fixed resistor 916 corresponds to an example of the first circuit in the present invention, and the second circuit 912 including the first fixed resistor 914 and the fourth fixed resistor 917 corresponds to an example of the second circuit in the present invention.

As shown in FIG. 10(c), one end of the first circuit 911 may be grounded and the power supply 913 may be connected to the other end of the second circuit 912. Similarly, although not shown in the drawings, in the examples shown in the above FIG. 9(b) to FIG. 9(d), FIG. 10(a) and FIG. 10(b), one end of the first circuit 911 may be grounded, and the power supply 913 may be connected to the other end of the second circuit 912.

Return to FIG. 7, when a touch-on signal is input from a touch panel controller 80 through a computer 100, the setting part 92 of the sensor controller 90 sets, as a reference value $OP_0$, an output value $OP_n$ of the pressure-sensitive sensor 50 at the time of or immediately before the detection of the contacting (that is, an output value $OP_n$ sampled at the time of or immediately before the detection of the contacting). The setting part 92 is provided for each pressure-sensitive sensor 50 and sets the reference value $OP_0$ for each pressure-sensitive sensor 50.

The reference value $OP_0$ also includes zero (0). When the touch-on signal indicates that approaching of the finger to the cover member 20 within a predetermined distance is detected, the setting part 92 sets, as the reference value $OP_0$, an output value $OP_n$ of the pressure-sensitive sensor 50 at the time of or immediately after the detection of the approaching (that is, an output value $OP_n$ sampled at the time of or immediately after the detection of the approaching).

The first calculation part 93 calculates a first pressing force $p_{n1}$ applied to the pressure-sensitive sensor 50 in accordance with the following expression (5). As shown in FIG. 7, as with the acquisition part 91 and the setting part 92 above, the first calculation part 93 is also provided to each pressure-sensitive sensor 50, and calculates the first pressure force $p_{n1}$ for each pressure-sensitive sensor 50.

[Expression 5]

$$p_{n1} = OP_n - OP_0 \tag{5}$$

The selection part 94 selects the minimum value among four reference values $OP_0$ which are set by the four setting parts 93, and sets, as a comparison value $S_0$, the minimum reference value.

The correction part 95 calculates a correction value $R_n$ of each pressure-sensitive sensor 50 in accordance with the following expression (6) and expression (7), and corrects the first pressing force $p_{n1}$ of the pressure-sensitive sensor 50 by using the correction value $R_n$. As is the case with the acquisition part 91, setting part 92, and the first calculation part 93, the correction part 95 is also provided for each pressure-sensitive sensor 50 as shown in FIG. 7, and corrects the first pressing force $p_{n1}$ for each pressure-sensitive sensor 50. In the following expression (7), the value $p_{n1}'$ represents a first pressing force after correction.

[Expression 6]

$$R_n = \frac{OP_0}{S_0} \tag{6}$$

[Expression 7]

$$p_{n1}' = p_{n1} \times R_n \tag{7}$$

As above, the pressure-sensitive sensor 50 has characteristics in a form of a curve where a rate of decrease in resistance values is duller as an applied load is larger. Accordingly, even when load variation amounts are the same, a phenomenon that resistance variation amounts are different from each other occurs depending on an initial load. Particularly, a different initial load may be applied to the four pressure-sensitive sensors 50 provided with the input device 1 due to the posture of the input device 1, and the like. Accordingly, the first pressing force $p_{n1}$ which is calculated by the first calculation part 93 greatly depends on the initial load of each pressure-sensitive sensor 50.

In contrast, in the present embodiment, since the first pressing force $p_{n1}$ is corrected by using the correction value $R_n$ to reduce an effect of the initial load with respect to the first pressing force $p_{n1}$, it is further possible to improve detection accuracy of the pressure-sensitive sensor 50.

As long as the selection part 94 selects any one value among reference values $OP_0$ as a comparison value $S_0$, the selection part 94 may select, for example, a maximum value among the reference values $OP_0$ as the comparison value $S_0$.

A method for correcting the first pressing force $p_{n1}$ by the selection part 94 is not particularly limited to the above-described method as long as the further the reference value $OP_0$ is greater than the comparison value $S_0$, the larger the first pressing force $p_{n1}$ is corrected, and the further the reference value $OP_0$ is smaller than the comparison value $S_0$, the smaller the first pressing force $p_{n1}'$ is corrected.

The second calculation part 96 calculates, as a second pressing force $p_{n2}$ which is applied to the cover member 20, the sum of first pressing forces $p_{n1}'$ of the four pressure-sensitive sensors 50 after correction in accordance with the following expression (8).

[Expression 8]

$$p_{n2} = \Sigma p_{n1}' \tag{8}$$

A sensitivity adjustment part 97 performs sensitivity adjustment for the second pressing force $p_{n2}$ in accordance with the following expression (9) to calculate a final pressing force $P_n$. The pressing force $P_n$ calculated with the expression (9) is output to the computer 100. In the following expression (9), $k_{adj}$ represents a coefficient for adjustment of an individual pressure difference of the operator, which is stored in advance, for example, in a sensitivity adjustment part 97, and can be accordingly set depending on the operator.

[Expression 9]

$$P_n = \frac{p_{n2}}{k_{adj}} \tag{9}$$

Although not particularly illustrated in the drawings, a selector may be interposed between the four pressure-sensitive sensors 50 and the sensor controller 90. In this case, the sensor controller 90 is only required to include each one of an acquisition part 91, a setting part 92, a first calculation part 93, and a second correction part 95.

The computer 100 is an electronic calculator including, although not particularly illustrated in drawings, a CPU, a main storage device (RAM or the like), an auxiliary storage device (a hard disk, SSD, or the like), and an interface, etc. As shown in FIG. 7, the touch panel controller 80 and sensor controller 90 are electrically connected to the computer 100 through an interface. The computer 100, although not illustrated in the drawings, determines an input operation intended by the operator on the basis of a position of the finger which is detected by the touch panel controller 80 and the pressing force $P_n$ which is detected by the sensor controller 90 by executing various types of programs stored in the auxiliary storage device.

Figure 12:
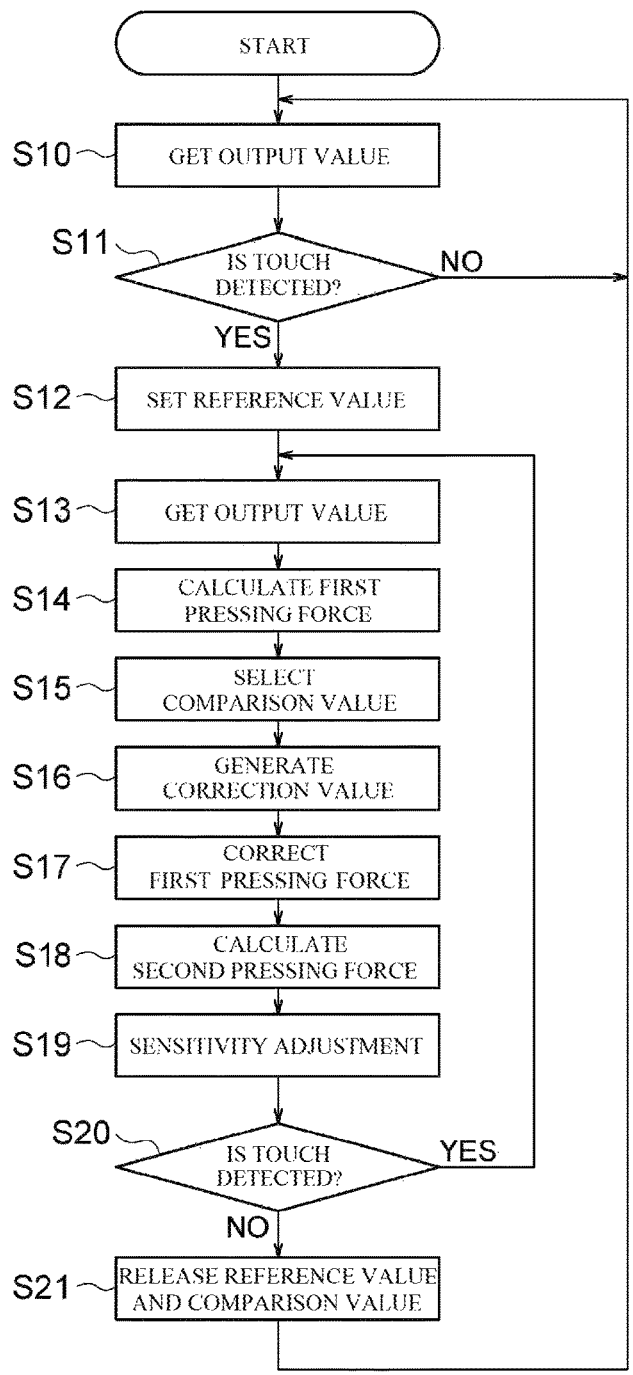
FIG. 12 is a flow chart showing a method for controlling the input device in the embodiment of the present invention.

Hereinafter, a method for controlling the input device in the present embodiment will be described with reference to FIG. 12. FIG. 12 is a flowchart illustrating the method for controlling the input device in the present embodiment.

When control of the input device 1 in the present embodiment is initiated, first, in step S10 of FIG. 12, the acquisition parts 91 obtain outputs from the four pressure-sensitive sensors 60, and output the output values $OP_n$ ($=V_{out}$) to the setting parts 92 and the first calculation parts 93. Then, in step S11, each of the setting parts 92 determines whether or not a touch-on signal is input from the touch panel controller 80.

As long as contacting of a finger of the operator with the cover member 20 is not detected by the touch panel controller 80 (NO in step S11 of FIG. 12), step S10 and step S11 are repeated.

On the other hand, when the contacting of the finger is detected by the touch panel controller 80 (YES in step S11 of FIG. 12), in step S12 of FIG. 12, the setting part 92 sets, as a reference value $OP_0$, an output value $OP_n$ which is sampled immediately before the detection of the contacting. The reference value $OP_0$ is set for each pressure-sensitive sensor 50, and thus four reference values $OP_0$ are set in the present embodiment.

When the reference values $OP_0$ are set, the acquisition part 91 obtains the output value $OP_n$ ($=V_{out}$) of the pressure-sensitive sensor 50 again in step S13 of FIG. 12. The output value $OP_n$ is obtained from each pressure-sensitive sensor 50.

Next, in step S14 of FIG. 12, the first calculation part 93 calculates a first pressing force $p_{n1}$ from the output value $OP_n$ and the reference value $OP_0$ in accordance with the expression (5) above. The first pressing force $p_{n1}$ is also calculated for each pressure-sensitive sensor 50.

Next, in step S15 of FIG. 12, the selection part 96 sets, as a comparison value $S_0$, the smallest value among the four reference values $OP_0$.

Then, in step S16 of FIG. 12, the correction part 96 calculates a correction value $R_n$ of each pressure-sensitive sensor 50 in accordance with the expression (6) above. Next, in step S17 of FIG. 12, the second correction part 95 corrects the first pressing force $p_{n1}$ using the correction value $R_n$ in accordance with the expression (7) above. The correction value $R_n$ is also calculated for each pressure-sensitive sensor 50.

Following this, in step S18 of FIG. 12, the second calculation part 96 calculates the sum of the first pressing force after correction $p'_{n1}$ of the four pressure-sensitive sensors 50 in accordance with the above expression (8) to determine a second pressing force $p_{n2}$.

Next, in step S19 of FIG. 12, the sensitivity adjustment part 97 performs sensitivity adjustment of the second pressing force $P_{n2}$ in accordance with the above expression (9). The second pressing force after the adjustment $P_n$ is output to the computer 100. Then, the computer 100 determines an input operation, which is performed by the operator to the input device 1, on the basis of the second pressing force after the adjustment $P_n$. Step S19 may be omitted, and the second pressing force $P_{n2}$ which is calculated in step S18 is output to the computer 100 in this case.

As long as the contact of the finger continues (YES in step S20 of FIG. 12), processing of the above-described steps S13 to S19 are periodically executed. Step S15 is required only for the first time after the touch-on signal is input from the touch panel controller 80.

In contrast, when the contact of the finger is not detected by the touch panel controller 80 (NO in step S20 of FIG. 12), the settings of the four reference values $OP_0$ and the comparison value $S_0$ are released in step S21 of FIG. 12, and the process returns to step S10 of FIG. 12.

Hereinafter, a method for producing the input device in the present embodiment is described with reference to FIG. 13 to FIG. 16.

Figure 13:
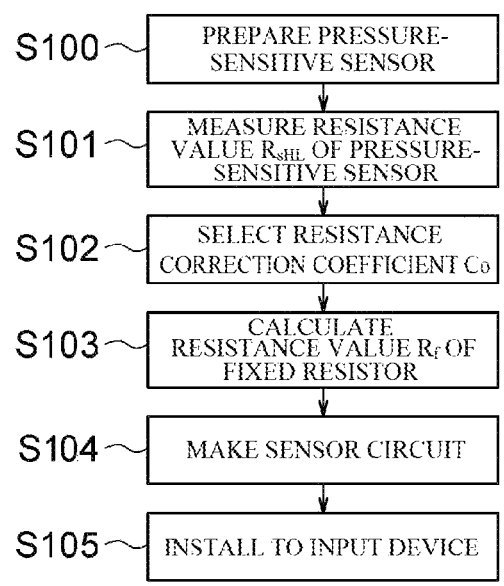
FIG. 13 is a process chart showing a method for producing the input device in the embodiment of the present invention.
Figure 14:
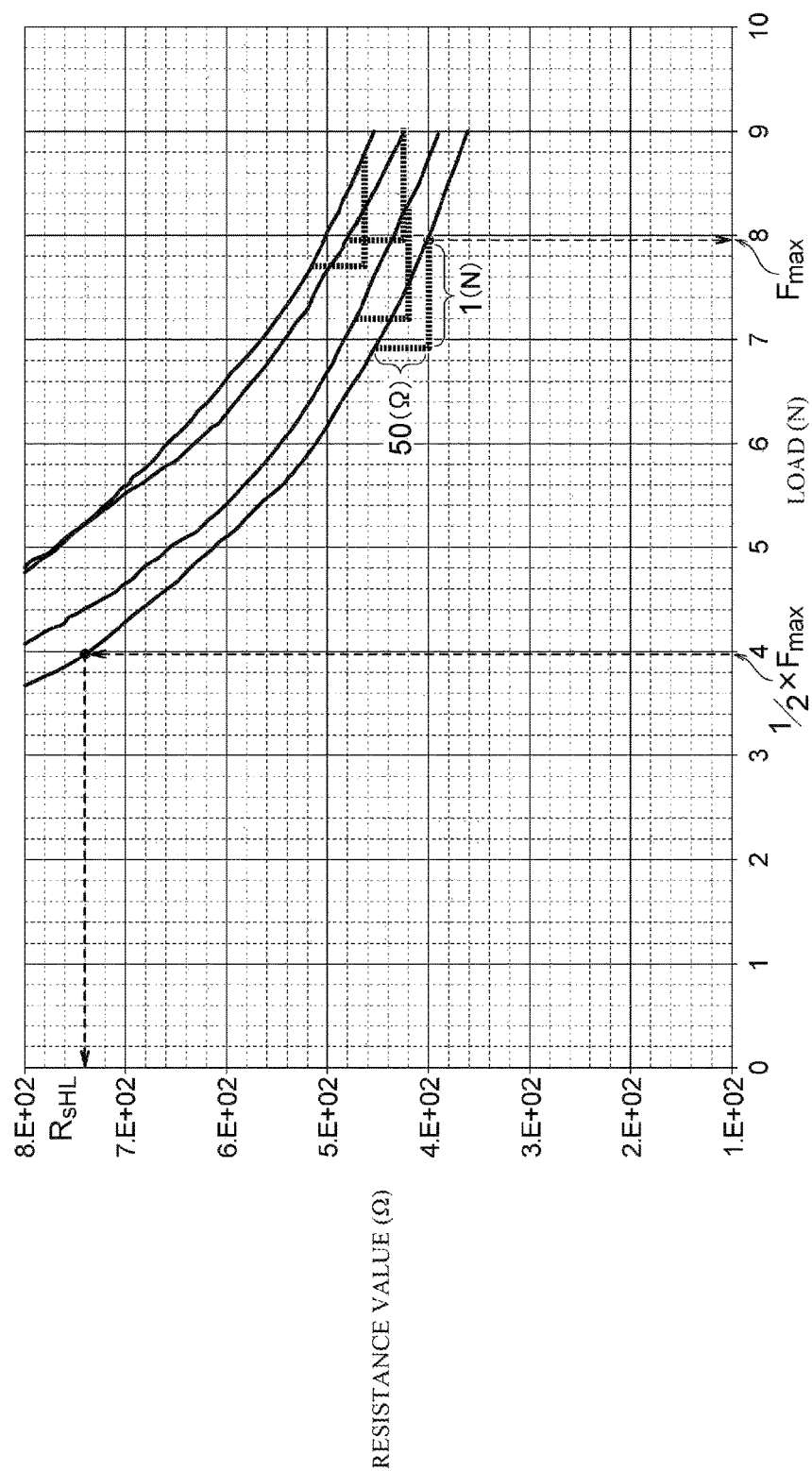
FIG. 14 is a graph showing load-resistance characteristics of a pressure-sensitive sensor in the embodiment of the present invention.
Figure 15:
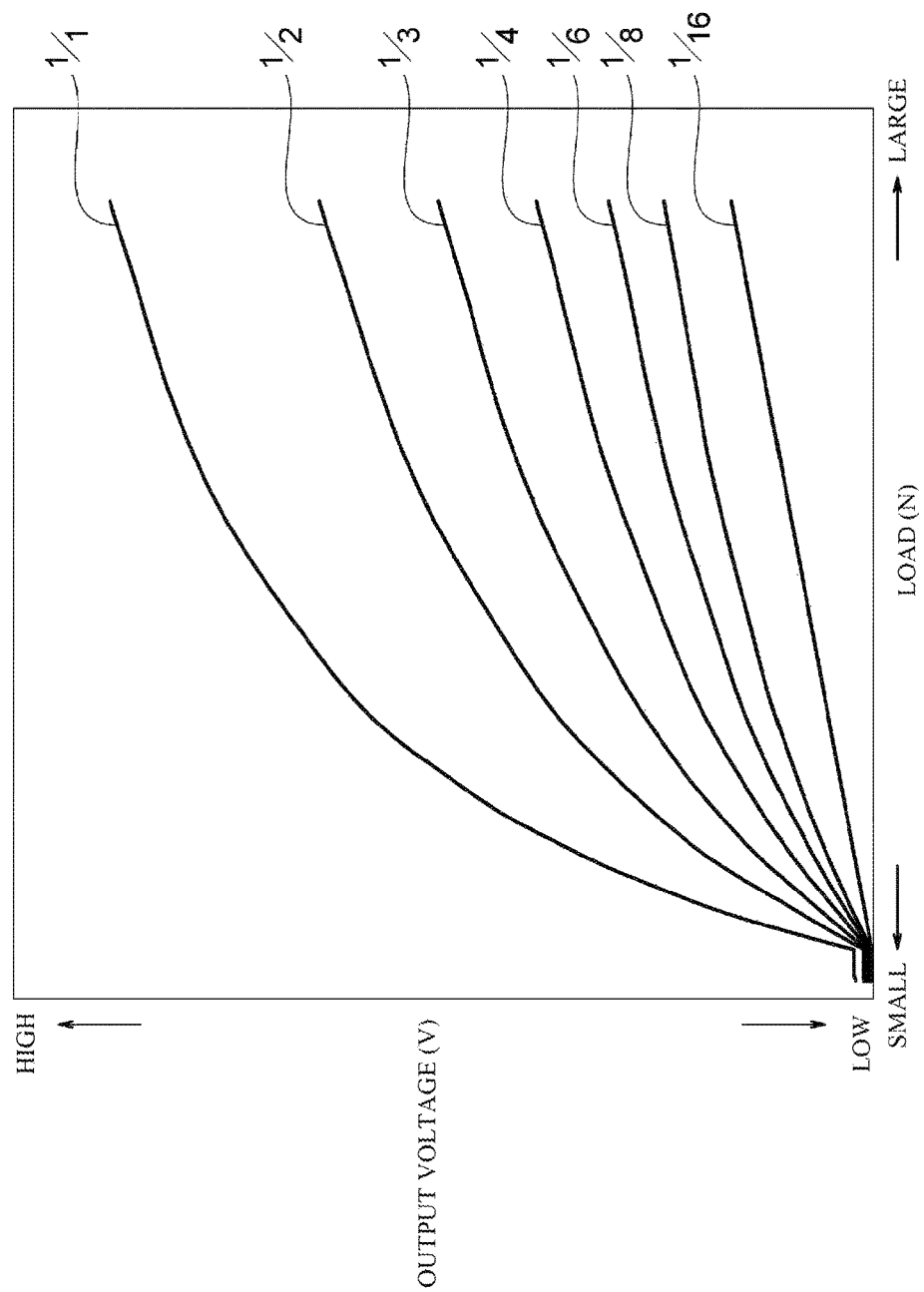
FIG. 15 is a graph showing an example of a standard profile used in step S102 in FIG. 13.

FIG. 13 is a process chart showing a method for producing the input device in the present embodiment. FIG. 14 is a graph showing load-resistance characteristics of the pressure-sensitive sensor in the present embodiment. FIG. 15 is a graph showing an example of a standard profile used in step S102 of FIG. 13.

In the present embodiment, first, in step S100 of FIG. 13, four pressure-sensitive sensors 50 with the configuration illustrated in FIG. 4 or FIG. 5 are prepared.

Next, in step S101 of FIG. 13, the pressure-sensitive sensor 50 is pressed with a load of 4 [N] (that is, ½ of the maximum working load 8 [N] of the pressure-sensitive sensor 50) while applying a predetermined voltage (for example, 5 [V]) to the pressure-sensitive sensor. Then, by measuring a resistance value of the pressure-sensitive sensor 50 in such state, a resistance value $R_{sHL}$ in the above expression (4) is determined. In the present embodiment, determination of the resistance value $R_{sHL}$ is performed individually for the four pressure-sensitive sensors 50, and consequently, four resistance values $R_{sHL}$ are determined.

When using, as the maximum working load of the pressure-sensitive sensor 50, the load at the point when a resistance value of the pressure-sensitive sensor 50 decreases by 50 [Ω] while the load applied to the pressure-sensitive sensor 50 increases by 1 [N], the resistance value $R_{sHL}$ is determined as follows.

For example, while applying a predetermined voltage to the pressure-sensitive sensor 50 and measuring a resistance value of the pressure-sensitive sensor 50, the pressure-sensitive sensor 50 is pressed from the above. Then, the pressing force with respect to the pressure-sensitive sensor 50 is gradually strengthened, and the pressing is stopped when the pressing force reaches a predetermined load (for example, 9 [N]).

Subsequently, as shown in FIG. 14, the load-resistance characteristics of the pressure-sensitive sensor 50 are plotted to a graph, and the load at the point when a decreased resistance amount of the pressure-sensitive sensor 50 became 50 [Ω] or less relative to the load increase amount of 1 [N] is determined to be the maximum working load. Next, a resistance value of the pressure-sensitive sensor 50 when ½ of the maximum working load is applied is read from the graph to determine the resistance value $R_{sHL}$ in the above expression (4).

The resistance value of the pressure-sensitive sensor 50 when ½ of the maximum working load is applied may be directly calculated from the measured data without plotting the measured data of the pressure-sensitive sensor 50 to a graph.

Then, in step S102 of FIG. 13, a resistance correction coefficient Co is selected. Specifically, in step S102, while referring to FIG. 15, a value of Co with a suitable profile for the linearity of the output characteristics and dynamic range required for the pressure-sensitive sensor 50 is selected from the seven types, 1/16, 1/8, 1/6, 1/4, 1/3, 1/2, and 1/1.

FIG. 15 is a standard load-output voltage profile of the pressure-sensitive sensor 50, which is prepared in advance as follows before producing of the input device 1.

First, a pressure-sensitive sensor 50 which has average characteristics is prepared, and a resistance value of the pressure-sensitive sensor 50 is measured at a plurality of load points. Then, by performing curve fitting using the measured resistance values, values of an intercept constant k and an inclination constant n are calculated. The following expression (10) is an empirical expression representing characteristics of the pressure-sensitive sensor 50 by utilizing pressure dependency of contact resistance, and F is the applied load.

[Expression 10]

$$R_s = k \times F^{-n} \quad (10)$$

Next, a resistance value $R_{sHL}$ of the pressure-sensitive sensor 50 when ½ of the maximum working load of the pressure-sensitive sensor 50 is applied is measured. Using the resistance value $R_{sHL}$ and a value of Co within the range of 1/16 to 1/1, a resistance value $R_f$ of the first fixed resistor 914 is calculated with the above expression (4).

Next, the resistance value $R_f$, the intercept constant k, and the inclination constant n are substituted into the following expression (11) and by plotting an output value $V_{out}$ by changing the applied load F, a standard profile of the pressure-sensitive sensor 50 shown in FIG. 15 is created. The following expression (11) is an expression obtained by substituting the above expression (10) into the expression (3).

[Expression 11]

$$V_{out} = V_{in} \frac{R_f}{R_f + k \times F^{-n}} \quad (11)$$

In the present embodiment, as specific examples of the resistance correction coefficient Co, seven examples, 1/16, 1/8, 1/6, 1/4, 1/3, 1/2, and 1/1, are indicated. However, the number of the resistance correction coefficient Co is not particularly limited as long as 1/16≥Co≥1/1 is satisfied.

Further, in the present embodiment, explanation is made to create a standard profile of the pressure-sensitive sensor by actual measurement. However, the method is not particularly limited thereto, and a standard profile of the pressure-sensitive sensor may be created by simulation or the like.

In step S102, the same resistance correction coefficient Co is selected for all (four in the present embodiment) pressure-sensitive sensors. However, as mentioned above, the resistance correction coefficient Co may be changed for each pressure-sensitive sensor 50. Specifically, as shown in FIG. 11, when a plurality of the pressure-sensitive sensors include the pressure-sensitive sensors 50a and 50b having different distances from the center CP of the panel unit 10, the resistance correction coefficient Co for the pressure-sensitive sensor 50b may be set smaller as the distance from the center CP of the panel unit 10 to the pressure-sensitive sensor 50b is shorter.

Next, in step S103 of FIG. 13, using the resistance value $R_{sHL}$ determined in step S101 above and the resistance correction coefficient Co selected in step S102 above, a resistance value $R_f$ of the first fixed resistor 914 is calculated with the above expression (4).

Then, in step S104 of FIG. 13, the first fixed resistor 914 having the resistance value $R_f$ is electrically connected to a sensor circuit 91 to complete the sensor circuit 91.

By connecting the first fixed resistor 914 having a predetermined resistance value to the sensor circuit 91 in advance and by trimming the first fixed resistor 914, the resistance value of the first fixed resistance value 914 may be adjust to $R_f$. Specifically, trimming of the first fixed resistor 914 is performed, for example, by printing and curing carbon paste onto a substrate to form a first fixed resistor 914 and by partially removing the first fixed resistor 914 by cutting or laser processing.

Subsequently, in step S105 of FIG. 13, by installing the sensor circuit 91 including the pressure-sensitive sensor 50 and the first fixed resistor 914 to an input device 1, the input device 1 is completed.

As above, in the present embodiment, the first fixed resistor 914 connected in series to the pressure-sensitive sensor 50 has a resistance value $R_f$ which satisfies the above expression (4). Particularly in the present embodiment, by using a value of 1/1 or less for the resistance correction coefficient Co in the expression (4) above, linearization of the output characteristics of the pressure-sensitive sensor 50 can be achieved, and consequently, detection accuracy of the pressure-sensitive sensor 50 can be improved.

Also, in the present embodiment, by using a value of 1/16 or greater for the resistance correction coefficient Co in the expression (4) above, linearization of the output characteristics of the pressure-sensitive sensor 50 can be achieved while securing excellent dynamic range of the pressure-sensitive sensor 50.

Step S100 of FIG. 13 in the present embodiment corresponds to an example of a first step in the present invention, step S101 of FIG. 13 in the present embodiment corresponds to an example of a second step in the present invention, step S102 of FIG. 13 in the present embodiment corresponds to an example of a third step in the present invention, and step S104 of FIG. 13 in the present embodiment corresponds to an example of a fourth step in the present invention.

The above-described embodiment is described for easy understanding of the invention, and is not intended to limit the invention. Accordingly, respective elements, which are disclosed in the above-described embodiment, are intended to include all design modifications or equivalents thereof which pertain to the technical scope of the invention.

EXAMPLES

By embodying the present invention in the following examples and comparative examples, advantageous effects of the present invention were confirmed. The following examples and comparative examples are used to confirm effectiveness in linearization of output characteristics of the pressure-sensitive sensor and in securing of a dynamic range of the pressure-sensitive sensor in the above-described embodiments.

Figure 16:
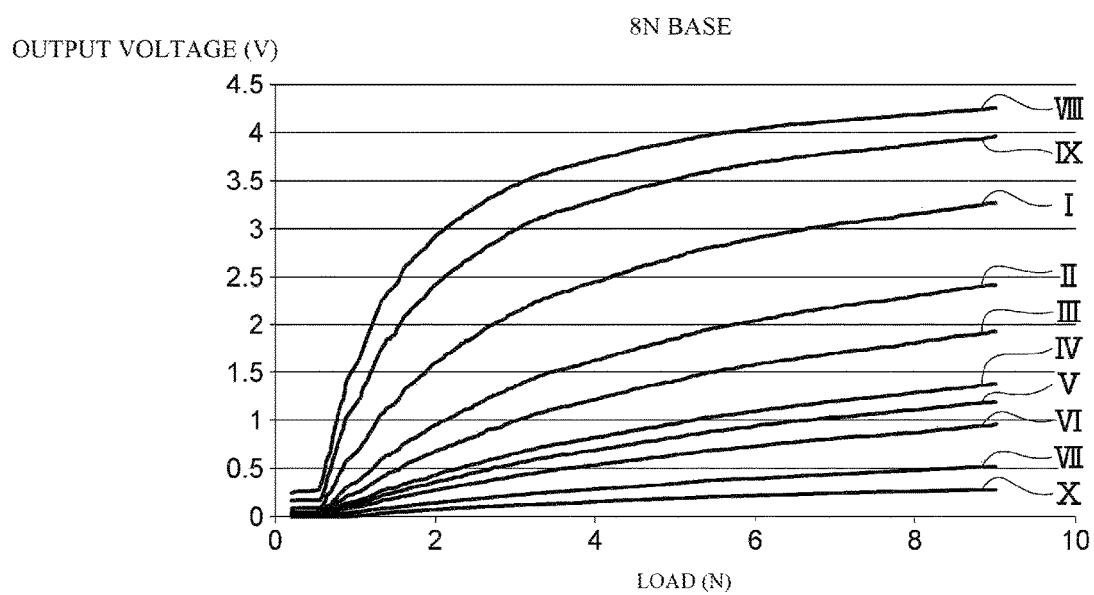
FIG. 16 is a graph showing output characteristics of Example 1 to Example 7 and Comparative Example 1 to Comparative Example 3.
Figure 17:
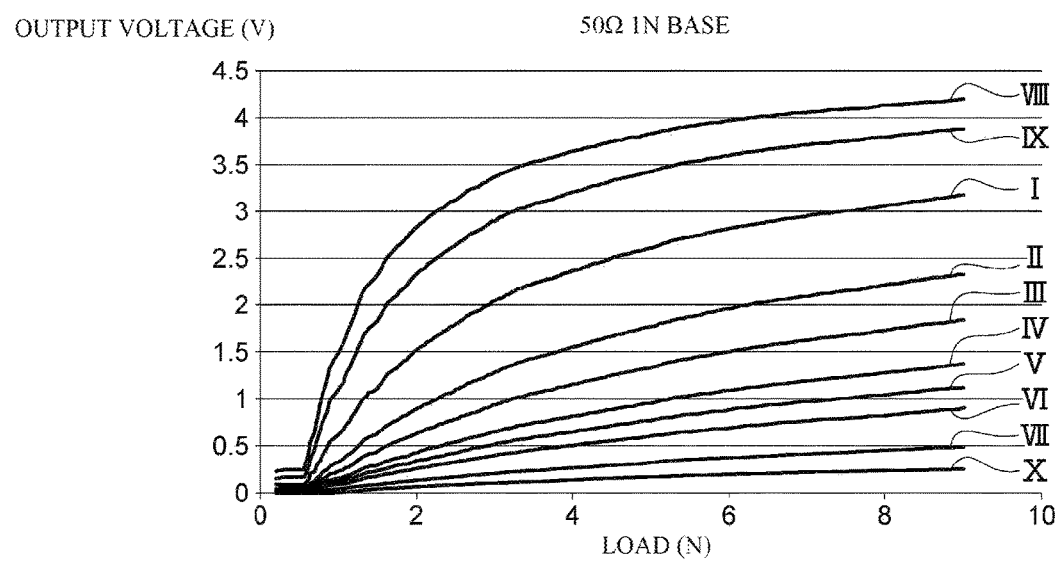
FIG. 17 is a graph showing output characteristics of Example 8 to Example 14 and Comparative Example 4 to Comparative Example 6.
Figure 18:
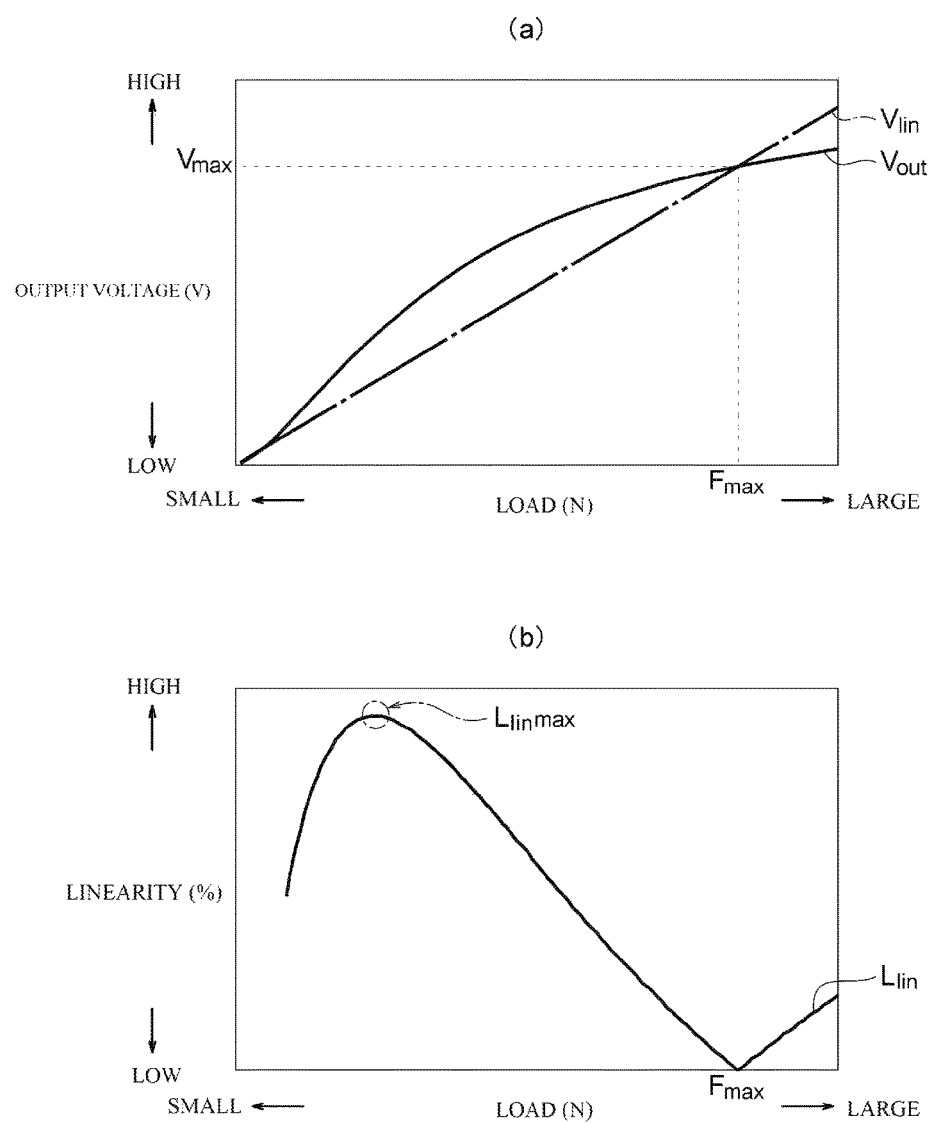
FIG. 18(a) and FIG. 18(b) are graphs to explain the concept of $L_{lin}$ used in linearity evaluation in the examples.

FIG. 16 is a graph showing output characteristics of Example 1 to Example 7 and Comparative Example 1 to Comparative Example 3. FIG. 17 is a graph showing output characteristics of Example 8 to Example 14 and Comparative Example 4 to Comparative Example 6. FIG. 18(*a*) and FIG. 18(*b*) are graphs to explain the concept of $L_{lin}$ used in linearity evaluation in the examples.

Example 1

In Example 1, a sensor circuit having a configuration shown in FIG. 8 was made using a pressure-sensitive sensor having a configuration shown in FIG. 5.

When making, a PET sheet having a thickness of 100 [μm] was used as the first and second base materials, and the first upper and lower electrode layers were formed by printing and curing a silver paste. In contrast, the second upper and lower electrode layers were formed by printing and curing high-resistance pressure-sensitive carbon paste. The thickness of these electrode layers were all 10 [μm]. The resistivity of the second upper and lower electrode layers was 100 [Ω·cm].

The outer diameter of the first upper electrode layer was made 6 [mm], the outer diameter of the second upper electrode layer was made 8 [mm], the outer diameter of the first lower electrode layer was made 7.5 [mm], and the outer diameter of the second lower electrode layer was made 8 [mm]. A double-sided adhesive sheet having a thickness of 10 [μm] was used as a spacer, and the inner diameter of the through-hole was made 7 [mm]. An elastic material having a thickness of 0.8 [mm] was attached onto the first base material through an adhesive tape having a thickness of 150 [μm].

While making the maximum working load of the pressure-sensitive sensor 8 [N], when a resistance value of the pressure-sensitive sensor to which a load of 4 [N] was applied was measured, a resistance value $R_{sHL}$ was 816 [Ω]. Also, the resistance correction coefficient Co was set to 1/1.

As a result, a resistance value $R_f$ of the first fixed resistor calculated by the above expression (4) was 816 [Ω]. The applied voltage $V_{in}$ of the power supply was set to 5 [V].

Then, an entire top surface of the pressure-sensitive sensor was uniformly pressed with an actuator through a disk of 20 [mm] in diameter made of stainless steel, and the pressing force was strengthened at a speed of 1 [mm/min.]. At this time, by measuring an output voltage $V_{out}$ with the sensor circuit and by plotting the measured data, load-output voltage characteristics shown as (I) in FIG. 16 was obtained.

With respect to the load-output voltage characteristics of the pressure-sensitive sensor obtained as above, linearity and dynamic range were evaluated.

The linearity of the output characteristics was evaluated using the maximum value $L_{lin}$max of linearity $L_{lin}$ represented by the following expression (12).

Specifically, when $L_{lin}$max was 110 [%] or less ($L_{lin}$max≤110 [%]), linearity of the output characteristics of the pressure-sensitive sensor was evaluated as excellent, and when $L_{lin}$max was 150 [%] or less ($L_{lin}$max≤150 [%]), then the linearity of the output characteristics of the pressure-sensitive sensor was evaluated as good. Whereas, when $L_{lin}$max was greater than 150 [%] ($L_{lin}$max>150 [%]), the linearity of the output characteristics of the pressure-sensitive sensor was evaluated as poor. Taking account of an influence of the initial load to the pressure-sensitive sensor, $L_{lin}$ values of 1 [N] and less were excluded from the evaluation.

[Expression 12]

$$L_{lin}\max = \max\left\{\left|\frac{V_{out}}{V_{lin}} - 1\right|\right\} \tag{12}$$

In the above expression (12), $V_{lin}$ is represented by the following expression (13). In the expression (13) below, $F_{max}$ is a maximum working load of the pressure-sensitive sensor, and $V_{max}$ is an output voltage when the maximum working load $F_{max}$ is applied.

[Expression 13]

$$V_{lin} = F \times \frac{V_{max}}{F_{max}} \tag{13}$$

The expression (12) above represents a maximum value of the following expression (14). The expression (14) represents a ratio of a shift in the output characteristics of the pressure-sensitive sensor with respect to the expression (13) above. In other words, as shown in FIG. 18(*a*), the following expression (14) represents a ratio of a shift of a curve shown with a solid line with respect to a straight line shown with a one-dotted chain line. The one-dotted chain line in the figure is a virtual ideal-straight line which passes through an output voltage $V_{max}$ when the maximum working load $F_{max}$ is applied and the origin. Also, the solid line in the figure represents the load-output voltage characteristics of the pressure-sensitive sensor. Further, the above expression (12) is the maximum value obtained from the following expression (14) as shown in FIG. 18(*b*).

[Expression 14]

$$L_{lin} = \left| \frac{V_{out}}{V_{lin}} - 1 \right| \quad (14)$$

In contrast, a dynamic range was evaluated based on whether or not an output voltage at the maximum working load $F_{max}$ can be represented with 256 levels or with 128 levels in a case where the minimum input voltage for the A/D converter of the acquisition part was 3 [mV].

Specifically, when the output voltage $V_{max}$ at the maximum working load $F_{max}$ was 0.768 [V] or more ($V_{max} \geq 0.768$ [V]), a dynamic range of the pressure-sensitive sensor was evaluated as sufficiently wide, and when the output voltage $V_{max}$ at the maximum working load $F_{max}$ was 0.384 [V] or more ($V_{max} \geq 0.384$ [V]), the dynamic range of the pressure-sensitive sensor was evaluated as wide. Whereas, when the output voltage $V_{max}$ at the maximum working load $F_{max}$ was less than 0.384 [V] ($V_{max} < 0.384$ [V]), the dynamic range of the pressure-sensitive sensor was evaluated as narrow and insufficient for practical use.

In Example 1, as shown in Table 1, linearity of the output characteristics of the pressure-sensitive sensor was good, and the dynamic range of the pressure-sensitive sensor was excellent.

In the "Linearity" column in Table 1, "A" indicates that the linearity of the output characteristics of the pressure-sensitive sensor was excellent, "B" indicates that the linearity of the output characteristics of the pressure-sensitive sensor was good, and "C" indicates that the linearity of the output characteristics of the pressure-sensitive sensor was poor.

Similarly, in the "Dynamic range" column in Table 1, "A" indicates that the dynamic range of the pressure-sensitive sensor was very wide, "B" indicates that the dynamic range of the pressure-sensitive sensor was sufficiently wide, and "C" indicates that the dynamic range of the pressure-sensitive sensor was narrow.

TABLE 1

| | Resistance correction coefficient Co | Lin | $V_{max}$ [V] | Linearity | Dynamic range |
|---|---|---|---|---|---|
| Example 1 | 1/1 | 144% | 3.14 | B | A |
| Example 2 | 1/2 | 108% | 2.29 | A | A |
| Example 3 | 1/3 | 91% | 1.81 | A | A |
| Example 4 | 1/4 | 74% | 1.28 | A | A |
| Example 5 | 1/6 | 69% | 1.10 | A | A |
| Example 6 | 1/8 | 63% | 0.87 | A | A |
| Example 7 | 1/16 | 53% | 0.48 | A | B |
| Comparative Example 1 | 3/1 | 175% | 4.18 | C | A |
| Comparative Example 2 | 2/1 | 171% | 3.86 | C | A |
| Comparative Example 3 | 1/32 | 47% | 0.25 | A | C |

Example 2 to Example 6

In Example 2 to Example 6, except that the resistance correction coefficient Co was changed to ½, ⅓, ¼, ⅙, and ⅛ respectively, a sensor circuit was made under the same conditions as in Example 1, and linearity of the output characteristics and dynamic range were evaluated. As a result, each of the load-output voltage characteristics indicated as (II) to (VI) in FIG. 16 were obtained. As shown in Table 1, in Example 2 to Example 6, linearity of the output characteristics and dynamic range of the pressure-sensitive sensor were both excellent.

Example 7

In Example 7, except that the resistance correction coefficient Co was changed to ⅟16, a sensor circuit was made under the same conditions as in Example 1, and linearity of the output characteristics and dynamic range were evaluated. As a result, the load-output voltage characteristics indicated as (VII) in FIG. 16 were obtained. As shown in Table 1, in Example 7, linearity of the output characteristics of the pressure-sensitive sensor was excellent, and dynamic range of the pressure-sensitive sensor was good.

Comparative Example 1 and Comparative Example 2

In Comparative Example 1 and Comparative Example 2, except that the resistance correction coefficient Co was changed to 3/1 and 2/1 respectively, a sensor circuit was made under the same conditions as in Example 1, and linearity of the output characteristics and dynamic range were evaluated. As a result, the load-output voltage characteristics indicated as (VIII) to (IX) in FIG. 16 were obtained. As shown in Table 1, in Comparative Example 1 and Comparative Example 2, although dynamic range of the pressure-sensitive sensor was excellent, linearity of the output characteristics of the pressure-sensitive sensor was poor.

Comparative Example 3

In Comparative Example 3, except that the resistance correction coefficient Co was changed to ⅟32, a sensor circuit was made under the same conditions as in Example 1, and linearity of the output characteristics and dynamic range were evaluated. As a result, the load-output voltage characteristics indicated as (X) in FIG. 16 were obtained. As shown in Table 1, in Comparative Example 3, although linearity of the output characteristics of the pressure-sensitive sensor was excellent, dynamic range of the pressure-sensitive sensor was poor.

Example 8

In Example 8, except that the maximum working load of the pressure-sensitive sensor was changed to the load at a point when the resistance value of the pressure-sensitive sensor decreases by 50 [Ω] while the applied load increases by 1 [N], a sensor circuit was made under the same conditions as in Example 1, and linearity of the output characteristics and dynamic range were evaluated. As a result, the load-output voltage characteristics indicated as (I) in FIG. 17 were obtained. As shown in Table 2, in Example 8, linearity of the output characteristics of the pressure-sensitive sensor was good, and the dynamic range of the pressure-sensitive sensor was excellent.

In Example 8, the maximum working load $F_{max}$ was 8.6 [N], the resistance value $R_{sHL}$ when ½ of the maximum working load $F_{max}$ was applied was 763 [Ω], and the resistance value $R_f$ of the first fixed resistor calculated with the above expression (4) was 763 [Ω].

TABLE 2

| | Resistance correction coefficient Co | Lin | $V_{max}$ [V] | Linearity | Dynamic range |
|---|---|---|---|---|---|
| Example 8 | 1/1 | 140% | 3.07 | B | A |
| Example 9 | 1/2 | 105% | 2.21 | A | A |
| Example 10 | 1/3 | 88% | 1.73 | A | A |
| Example 11 | 1/4 | 74% | 1.31 | A | A |
| Example 12 | 1/6 | 67% | 1.05 | A | A |
| Example 13 | 1/8 | 62% | 0.83 | A | A |
| Example 14 | 1/16 | 52% | 0.47 | A | B |
| Comparative Example 4 | 3/1 | 175% | 4.13 | C | A |
| Comparative Example 5 | 2/1 | 170% | 3.81 | C | A |
| Comparative Example 6 | 1/32 | 47% | 0.25 | A | C |

Example 9 to Example 13

In Example 9 to Example 13, except that the resistance correction coefficient Co was changed to ½, ⅓, ¼, ⅙, and ⅛ respectively, a sensor circuit was made under the same conditions as in Example 8, and linearity of the output characteristics and dynamic range were evaluated. As a result, the load-output voltage characteristics indicated as (II) to (VI) in FIG. 17 were obtained. As shown in Table 2, in Example 9 to Example 13, linearity of the output characteristics and dynamic range of the pressure-sensitive sensor were both excellent.

Example 14

In Example 14, except that the resistance correction coefficient Co was changed to 1/16, a sensor circuit was made under the same conditions as in Example 8, and linearity of the output characteristics and dynamic range were evaluated. As a result, the load-output voltage characteristics indicated as (VII) in FIG. 17 were obtained. As shown in Table 2, in Example 14, linearity of the output characteristics of the pressure-sensitive sensor was excellent, and dynamic range of the pressure-sensitive sensor was good.

Comparative Example 4 and Comparative Example 5

In Comparative Example 4 and Comparative Example 5, except that the resistance correction coefficient Co was changed to 3/1 and 2/1 respectively, a sensor circuit was made under the same conditions as in Example 8, and linearity of the output characteristics and dynamic range were evaluated. As a result, the load-output voltage characteristics indicated as (VIII) to (IX) in FIG. 17 were obtained. As shown in Table 2, in Comparative Example 4 and Comparative Example 5, although dynamic range of the pressure-sensitive sensor was excellent, linearity of the output characteristics of the pressure-sensitive sensor was poor.

Comparative Example 6

In Comparative Example 6, except that the resistance correction coefficient Co was changed to 1/32, a sensor circuit was made under the same conditions as in Example 8, and linearity of the output characteristics and dynamic range were evaluated. As a result, the load-output voltage characteristics indicated as (X) in FIG. 17 were obtained. As shown in Table 2, in Comparative Example 6, although linearity of the output characteristics of the pressure-sensitive sensor was excellent, dynamic range of the pressure-sensitive sensor was poor.

As described above, in Example 1 to Example 14 where the resistance value $R_f$ of the first fixed resistor satisfies the expression (4) above, linearization of the output characteristics of the pressure-sensitive sensor was achieved while securing excellent dynamic range of the pressure-sensitive sensor.

Particularly, in Example 3 to Example 6 and Example 10 to Example 13, where the resistance correction coefficient Co was within the range of ⅛ to ⅓, all values of $L_{lin}max$ were 100% or less and also the output voltage $V_{max}$ at the maximum working load $F_{max}$ was 0.768 [V] or more, and linearization of the output characteristics and dynamic range were both excellent.

Whereas, in Comparative Example 1, Comparative Example 2, Comparative Example 4, and Comparative Example 5, where the resistance correction coefficient Co was made greater than 1/1 in the expression (4) above, although good dynamic range of the pressure-sensitive sensor was secured, linearization of the output characteristics of the pressure-sensitive sensor could not be sufficiently achieved. Further, in Comparative Example 3 and Comparative Example 6, where the resistance correction coefficient Co was made less than 1/16 in the above expression (4), although linearization of the output characteristics of the pressure-sensitive sensor was achieved, satisfactory dynamic range of the pressure-sensitive sensor could not be secured.

DESCRIPTION OF REFERENCE NUMERALS

1: Input device
10: Panel unit
20: Cover member
30: Touch panel
40: Display device
50, 50B: Pressure-sensitive sensor
51: Detecting part
52: First electrode sheet
521: First base material
522, 522B: Upper electrode
523: First electrode layer
524: Second electrode layer
525: Protruding part
53: Second substrate
531: Second base material
532: Lower electrode
533: First electrode layer
534: Second electrode layer
54, 54B: Spacer
541: Opening
55: Elastic member
551: Gluing agent
60: Seal member
70: First support member
75: Second support member
80: Touch panel controller
90: Sensor controller
91: Acquisition part
911: First circuit
912: Second circuit
913: Power supply
914: First fixed resistor
915: Second fixed resistor 916: Third fixed resistor
917: Fourth fixed resistor
918: A/D converter
92: Setting part
93: First calculation part
94: Selection part
95: Correction part
96: Second calculation part
97: Sensitivity adjustment part
100: Computer

The invention claimed is:

1. A method for producing an input device which includes at least one sensor circuit including a first circuit and a second circuit, the first circuit including a pressure-sensitive sensor whose resistance value continuously changes in accordance with a magnitude of a pressing force, and the second circuit including a fixed resistor and being electrically connected to the pressure-sensitive sensor, the method comprising:
  (a) preparing the pressure-sensitive sensor;
  (b) measuring a combined resistance value $R_{sHL}$ of the first circuit when ½ of a maximum working load of the pressure-sensitive sensor is applied;
  (c) selecting a resistance correction coefficient Co from a range of 1/16 to 1/1; and
  (d) making the sensor circuit by preparing the second circuit which has a combined resistance value $R_f$ of a following expression: $R_f = R_{sHL} \times CO$.

2. The method for producing the input device according to claim 1, wherein the maximum working load is 8 [N].

3. The method for producing the input device according to claim 1, wherein
  the maximum working load is a load at a point when the combined resistance value of the first circuit decreases by 50 [Ω] while a load applied to the pressure-sensitive sensor increases by 1 [N].

4. The method for producing an input device according to claim 1, wherein
  the (c) includes selecting the resistance correction coefficient Co from a range of 1/8 to 1/2.

5. The method for producing the input device according to claim 1, wherein
  the input device includes a plurality of sensor circuits each of which is the sensor circuit. and
  resistance correction coefficients Co of the sensor circuits selected in the (c) are the same.

6. The method for producing the input device according to claim 1, wherein
  the input device includes:
    a panel unit which includes at least a touch panel; and
    a plurality of sensor circuits each of which is the sensor circuit;
  each of the pressure-sensitive sensors detects a load applied through the panel unit, and
  as a distance from a center of the panel unit to the pressure-sensitive sensor is shorter in a plan view, the resistance correction coefficient Co of the sensor circuit selected in the (c) is smaller.

7. The method for producing the input device according to claim 1, wherein
  the pressure-sensitive sensor includes:
    a spacer with an opening;
    first and second substrates which face each other through the spacer;
    a first electrode which is arranged on the first substrate at a position where the first electrode corresponds to the opening; and
    a second electrode which is arranged on the second substrate at a position where the second electrode corresponds to the opening and faced to the first electrode.

* * * * *